United States Patent
Ek et al.

(10) Patent No.: US 12,433,755 B2
(45) Date of Patent: Oct. 7, 2025

(54) ARTICULAR SURFACE IMPLANT SYSTEMS AND METHODS INCLUDING GLENOID REVERSE SHOULDER

(71) Applicant: Arthrosurface Incorporated, Franklin, MA (US)

(72) Inventors: Steven W. Ek, Bolton, MA (US); William B. Murphy, Brockton, MA (US); Anthony Miniaci, Bentleyville, OH (US)

(73) Assignee: ARTHROSURFACE INCORPORATED, West Bridgewater, MA (US)

( * ) Notice: Subject to any disclaimer, the term of this patent is extended or adjusted under 35 U.S.C. 154(b) by 790 days.

(21) Appl. No.: 17/619,039

(22) PCT Filed: Jun. 12, 2020

(86) PCT No.: PCT/US2020/037492
§ 371 (c)(1),
(2) Date: Dec. 14, 2021

(87) PCT Pub. No.: WO2020/252308
PCT Pub. Date: Dec. 17, 2020

(65) Prior Publication Data
US 2022/0296381 A1    Sep. 22, 2022

Related U.S. Application Data

(60) Provisional application No. 62/886,095, filed on Aug. 13, 2019, provisional application No. 62/861,648, filed on Jun. 14, 2019.

(51) Int. Cl.
*A61F 2/40* (2006.01)
*A61B 17/86* (2006.01)
(Continued)

(52) U.S. Cl.
CPC ........ *A61F 2/4081* (2013.01); *A61B 17/8605* (2013.01); *A61F 2/4612* (2013.01);
(Continued)

(58) Field of Classification Search
CPC .... A61F 2002/4085; A61F 2002/30332; A61F 2002/4619; A61F 2002/30383; A61F 2002/30385; A61F 2002/30387
See application file for complete search history.

(56) References Cited

U.S. PATENT DOCUMENTS 9,510,952 B2 * 12/2016 Muir ......................... A61F 2/40
2003/0149485 A1 * 8/2003 Tornier ............... A61F 2/30721
606/65

(Continued)

FOREIGN PATENT DOCUMENTS

| EP | 2689750 A1 | 1/2014 | |
| EP | 2901971 A1 | 8/2015 | |
| WO | WO-2019079104 A2 * | 4/2019 | ............... A61F 2/40 |

OTHER PUBLICATIONS

International Search Report and Written Opinion for International Patent Application No. PCT/US2020/037492 mailed on Oct. 2, 2020, 10 pages.

*Primary Examiner* — Melanie R Tyson
*Assistant Examiner* — Paris Marie Blass
(74) *Attorney, Agent, or Firm* — Grossman, Tucker, Perreault & Pfleger, PLLC

(57) ABSTRACT

The present disclosure provides an implant system. The implant system includes an anchor configured to be secured to bone within an excision site formed in a patient's glenoid, said anchor including a shank and an enlarged head. The implant system also includes a baseplate including a body comprising: a bone facing surface; an implant facing surface; and a channel configured to extend radially from an entrance in an outer periphery of said body to a central (Continued)

region of said baseplate, said channel configured to receive said enlarged head and a portion of said shank and including an open region formed, at least in part, in said bone facing surface. The implant system also includes an implant including a body defining a load bearing surface and a baseplate recess, said baseplate recess configured to receive at least a portion of said implant facing surface to said baseplate such that said implant is coupled to said baseplate.

22 Claims, 38 Drawing Sheets

(51) Int. Cl.
  *A61F 2/30* (2006.01)
  *A61F 2/46* (2006.01)
(52) U.S. Cl.
  CPC ............... *A61F 2002/30227* (2013.01); *A61F 2002/30332* (2013.01); *A61F 2002/30385* (2013.01); *A61F 2002/30433* (2013.01); *A61F 2002/30649* (2013.01); *A61F 2002/30827* (2013.01); *A61F 2002/3085* (2013.01); *A61F 2002/4085* (2013.01)

(56) References Cited

U.S. PATENT DOCUMENTS

| | | | |
|---|---|---|---|
| 2004/0220674 A1* | 11/2004 | Pria | A61F 2/40 623/19.12 |
| 2009/0149961 A1* | 6/2009 | Dallmann | A61F 2/4003 623/19.12 |
| 2013/0261750 A1* | 10/2013 | Lappin | A61B 17/8042 623/19.11 |
| 2014/0025173 A1* | 1/2014 | Cardon | A61F 2/4081 623/19.13 |
| 2014/0277521 A1* | 9/2014 | Chavarria | A61B 17/746 623/19.13 |
| 2018/0161169 A1 | 6/2018 | Tornier | |
| 2021/0228372 A1* | 7/2021 | Knox | A61F 2/4059 |
| 2021/0290410 A1* | 9/2021 | Schumacher | A61B 17/1615 |

\* cited by examiner

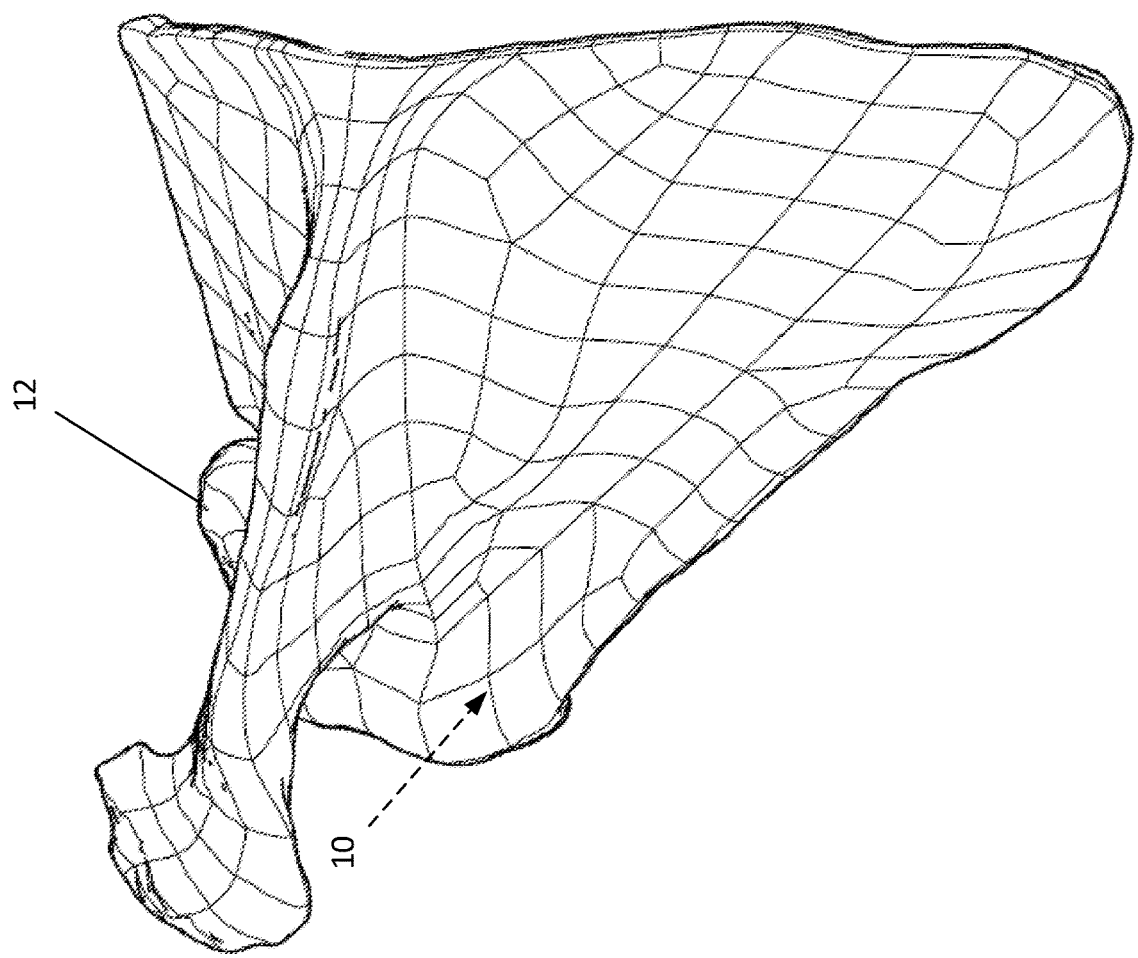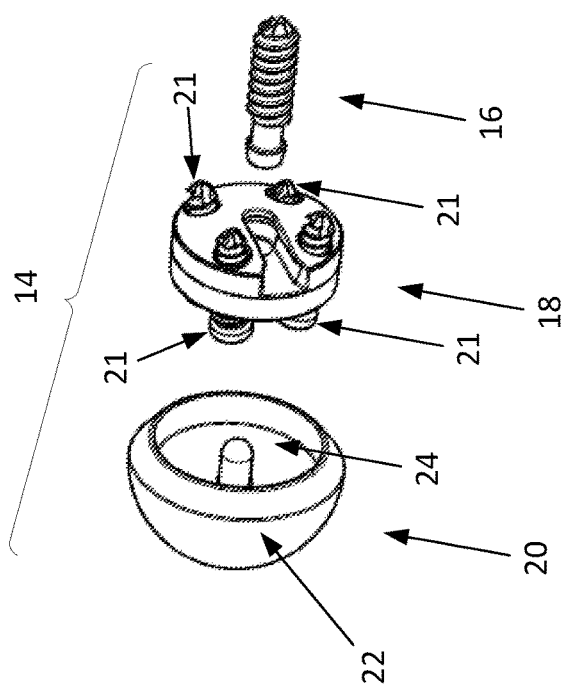
FIG. 2

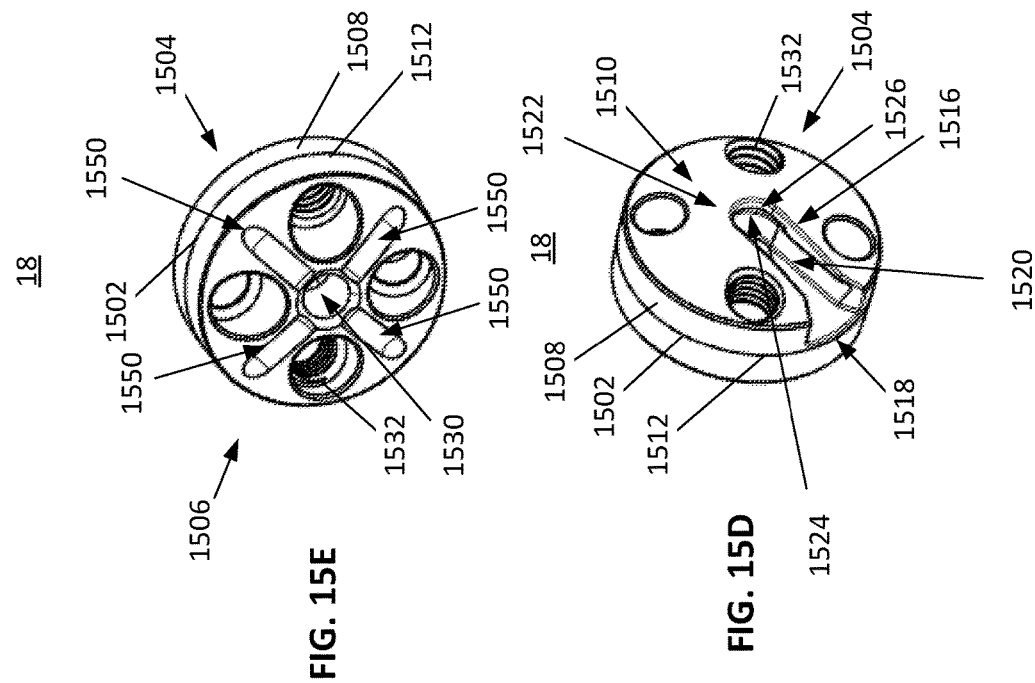
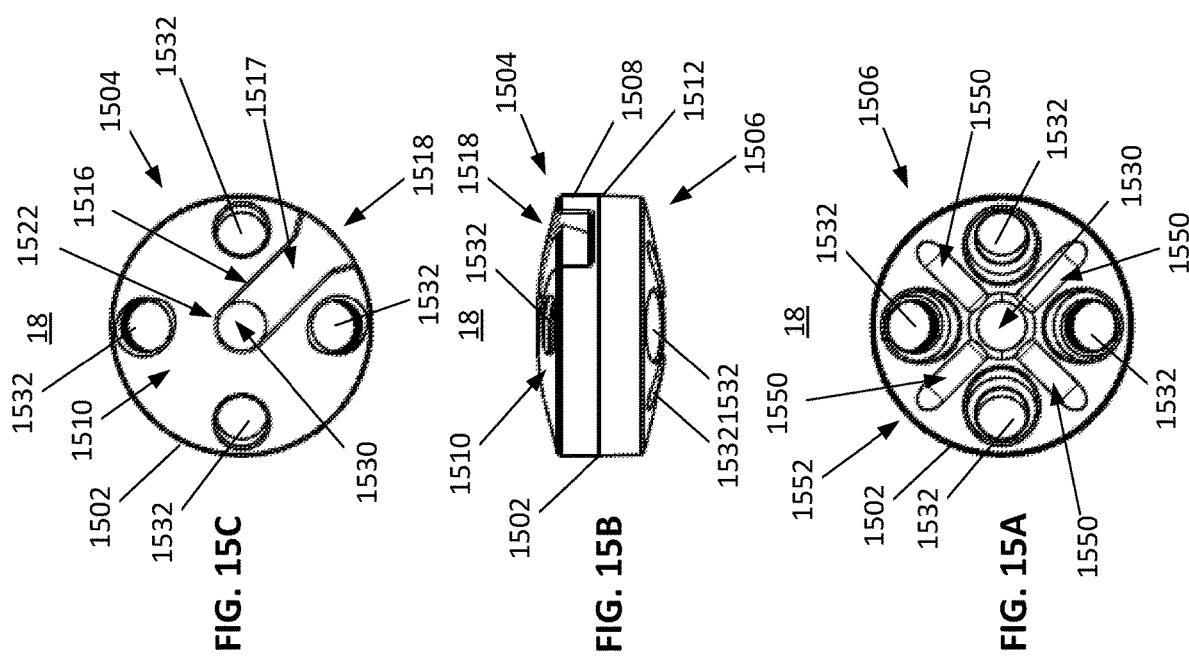

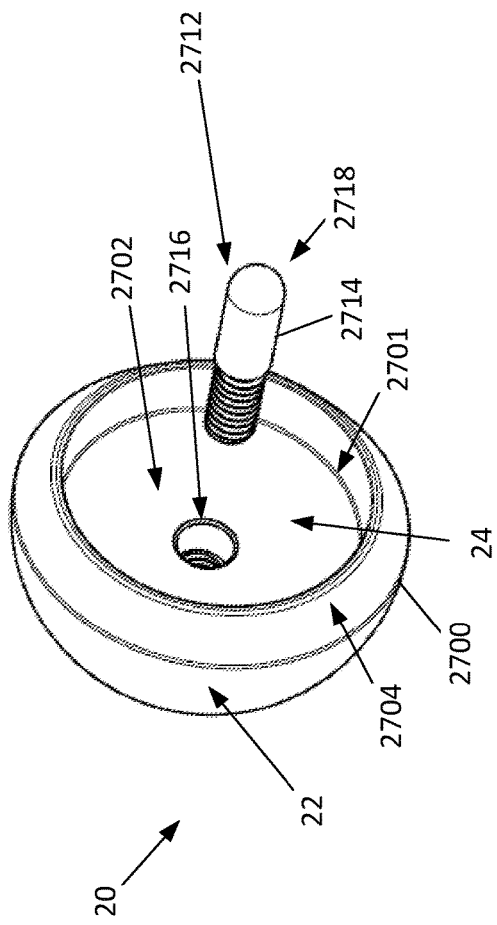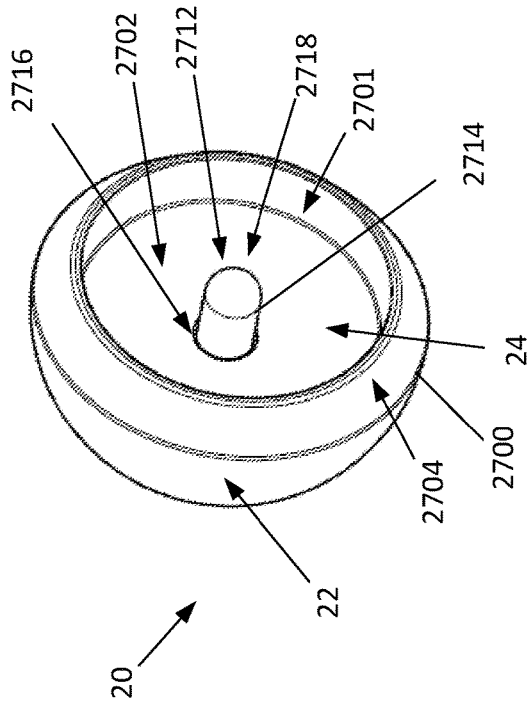

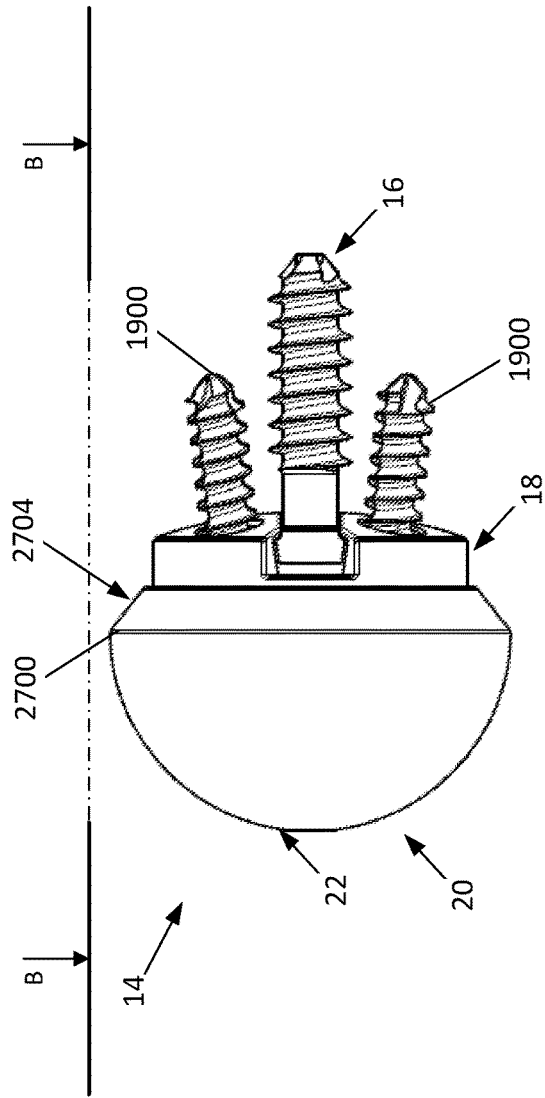
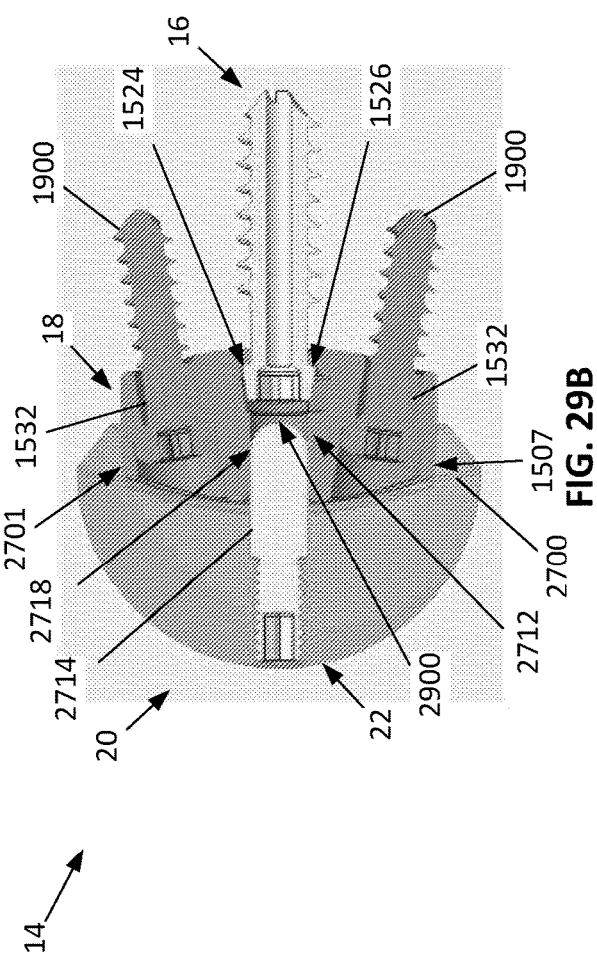
FIG. 29A
FIG. 29B

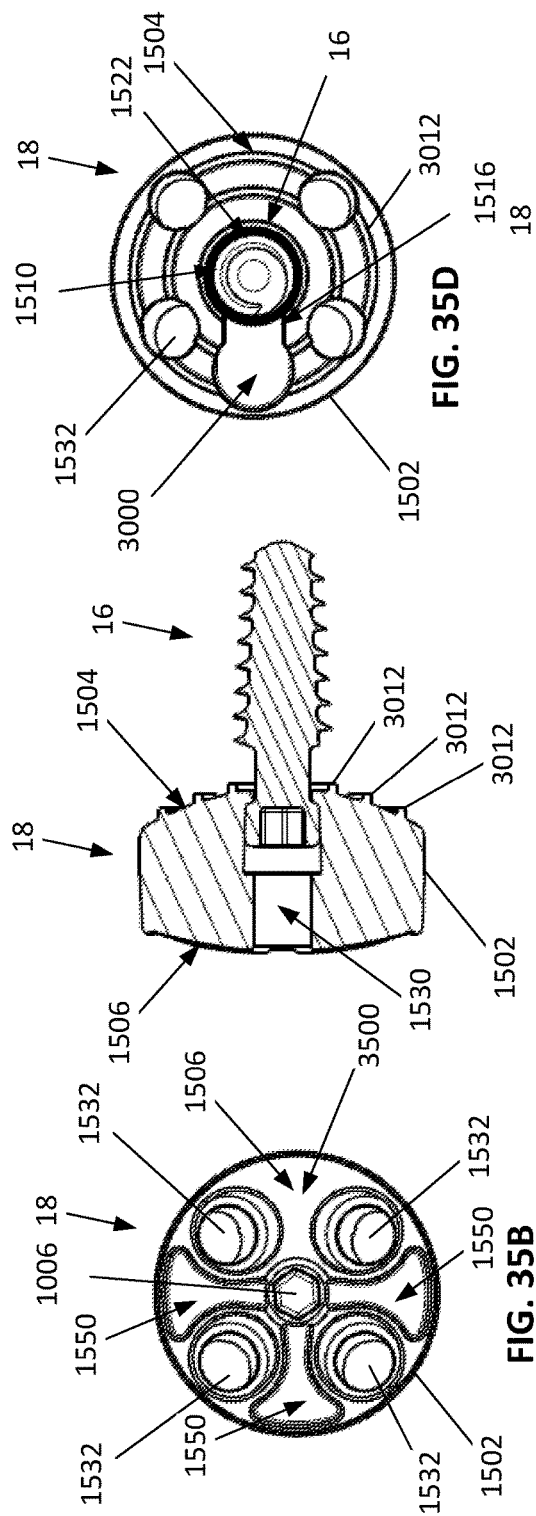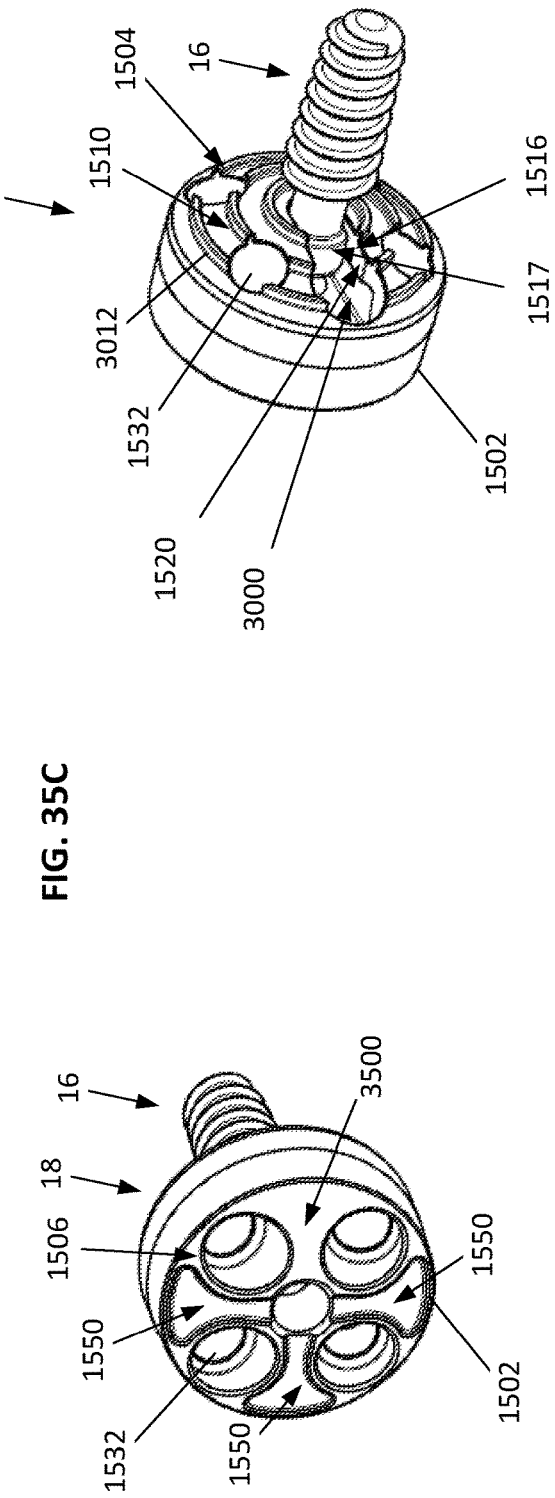

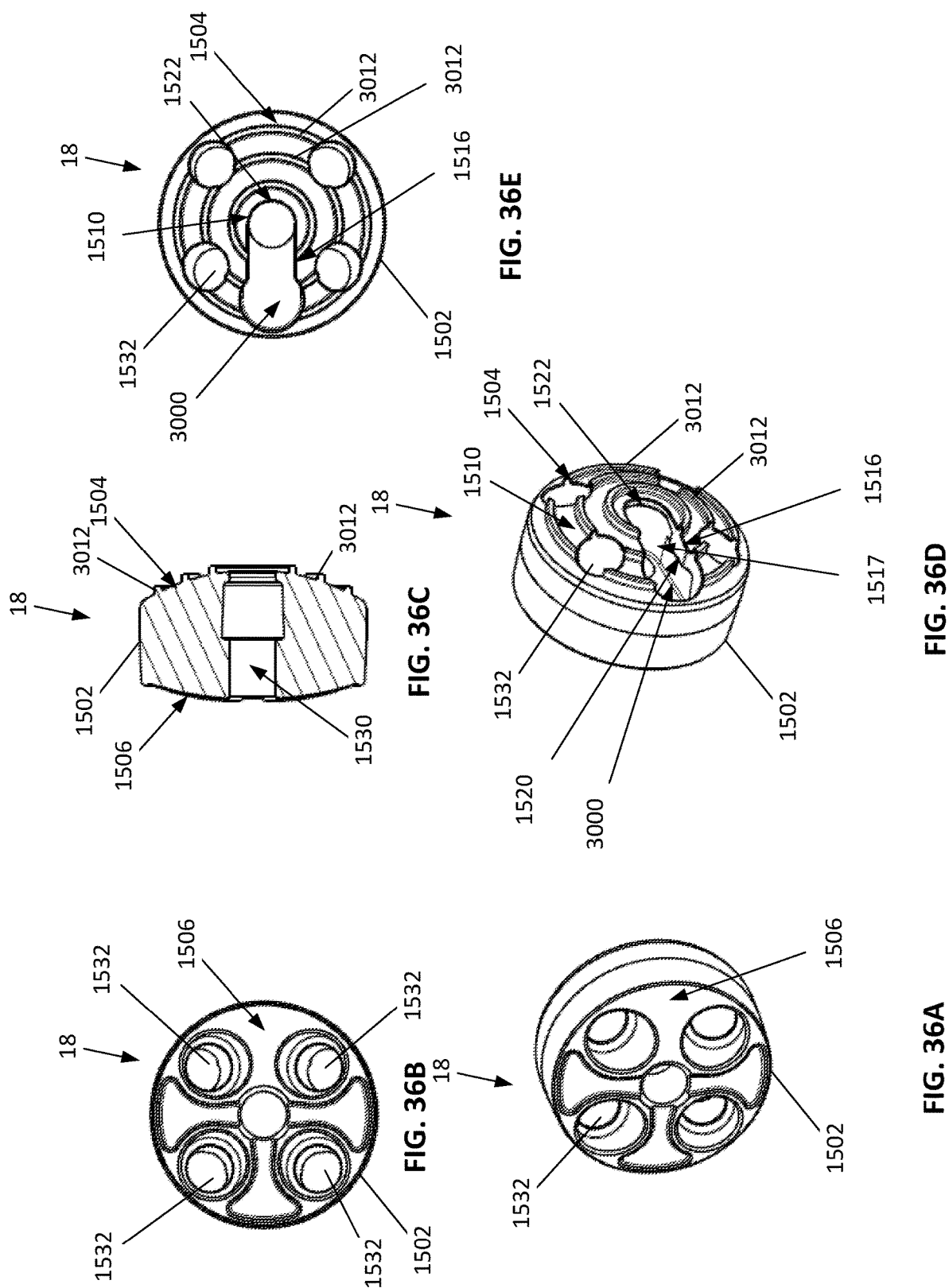

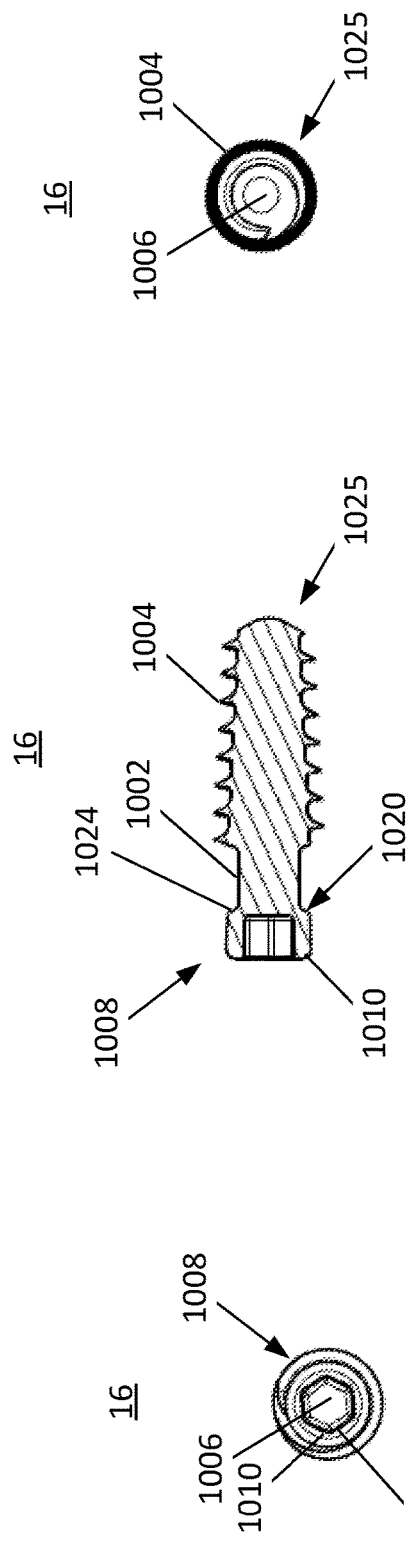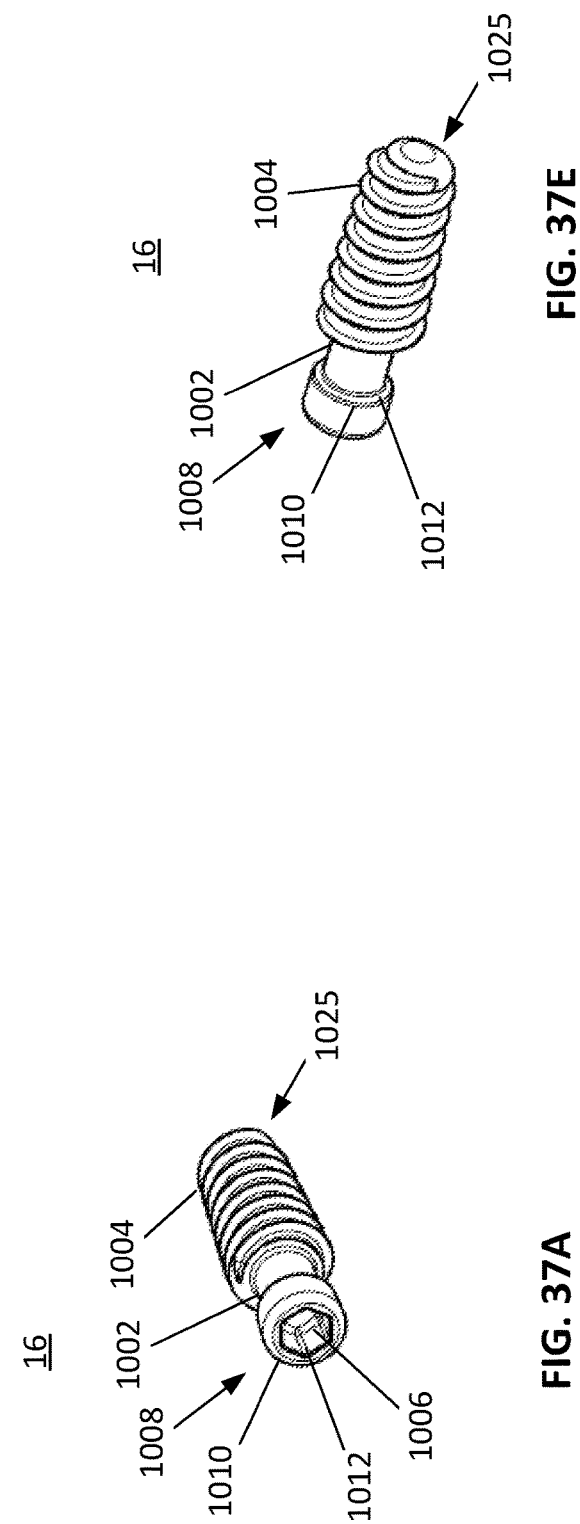

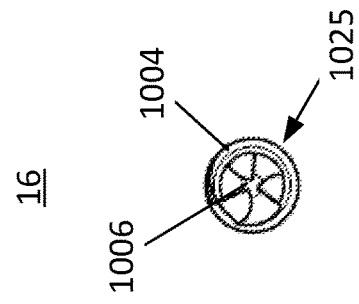
FIG. 38D
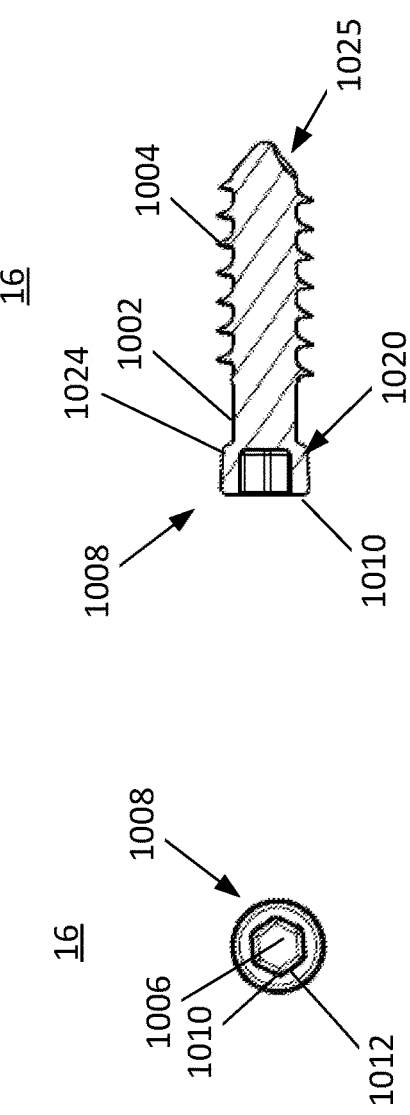
FIG. 38C
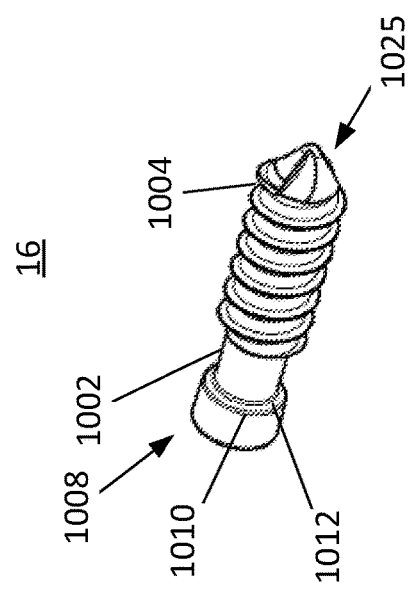
FIG. 38E
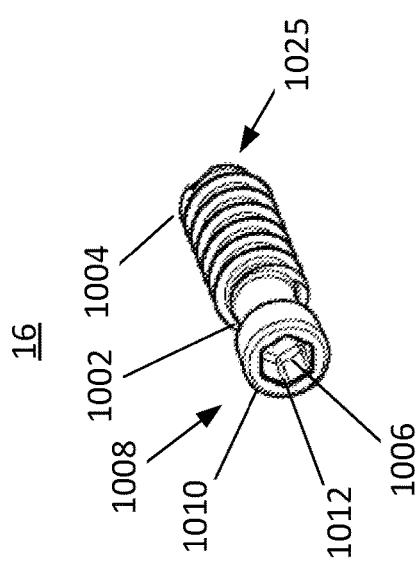
FIG. 38B
FIG. 38A

ARTICULAR SURFACE IMPLANT SYSTEMS AND METHODS INCLUDING GLENOID REVERSE SHOULDER

This application is a National Stage Application of PCT/US20/37492 filed Jun. 12, 2020 and claims the benefit of U.S. Provisional Application Ser. No. 62/861,648, filed Jun. 14, 2019. This application also claims the benefit of U.S. Provisional Application Ser. No. 62/886,095, filed Aug. 13, 2019, the entire disclosures of each of which are fully incorporated herein by reference.

FIELD

The present disclosure is related to devices and methods for the repair of defects that occur in articular cartilage on the surface of bones, and particularly to systems and methods for repairing the glenoid.

BACKGROUND

Articular cartilage, found at the ends of articulating bones in the body, is typically composed of hyaline cartilage, which has many unique properties that allow it to function effectively as a smooth and lubricious load-bearing surface. When injured, however, hyaline cartilage cells are not typically replaced by new hyaline cartilage cells. Healing is dependent upon the occurrence of bleeding from the underlying bone and formation of scar or reparative cartilage called fibrocartilage. While similar, fibrocartilage does not possess the same unique aspect of native hyaline cartilage and tends to be less durable.

In some cases, it may be necessary or desirable to repair the damaged articular cartilage using one or more implants. While implants may be successfully used, the implant should be designed to maximize the patient's comfort, minimize damage to surrounding areas, minimize potential further injury, maximize the functional life of the implant, and be easy to install.

BRIEF DESCRIPTION OF THE DRAWINGS

Features and advantages of the present invention are set forth by description of embodiments consistent with the present invention, which description should be considered in conjunction with the accompanying drawings wherein:

FIG. 2 generally illustrates another view of the implant system in an exploded, unassembled state and the excision site consistent with the present disclosure;

FIGS. 15A-15E generally illustrate various views of one example of the baseplate consistent with the present disclosure;

FIG. 27A generally illustrates one example of the implant and an implant remover in an exploded, unassembled state consistent with the present disclosure;

FIG. 27B generally illustrates one example of the implant and an implant remover in an assembled state consistent with the present disclosure;

FIG. 29A generally illustrates one example of the implant system in an assembled state consistent with the present disclosure;

FIG. 29B generally illustrates a cross-sectional view of the implant system taken along lines B-B of FIG. 29A;

FIGS. 35A-35E generally illustrate various views of the baseplate and anchor of FIG. 30;

FIGS. 36A-36E generally illustrate various views of the baseplate of FIG. 30;

FIGS. 37A-37E generally illustrate various views of one example of an anchor of FIG. 30; and FIGS. 38A-38E generally illustrate various views of another example of an anchor of FIG. 30.

DETAILED DESCRIPTION

Figure 1:
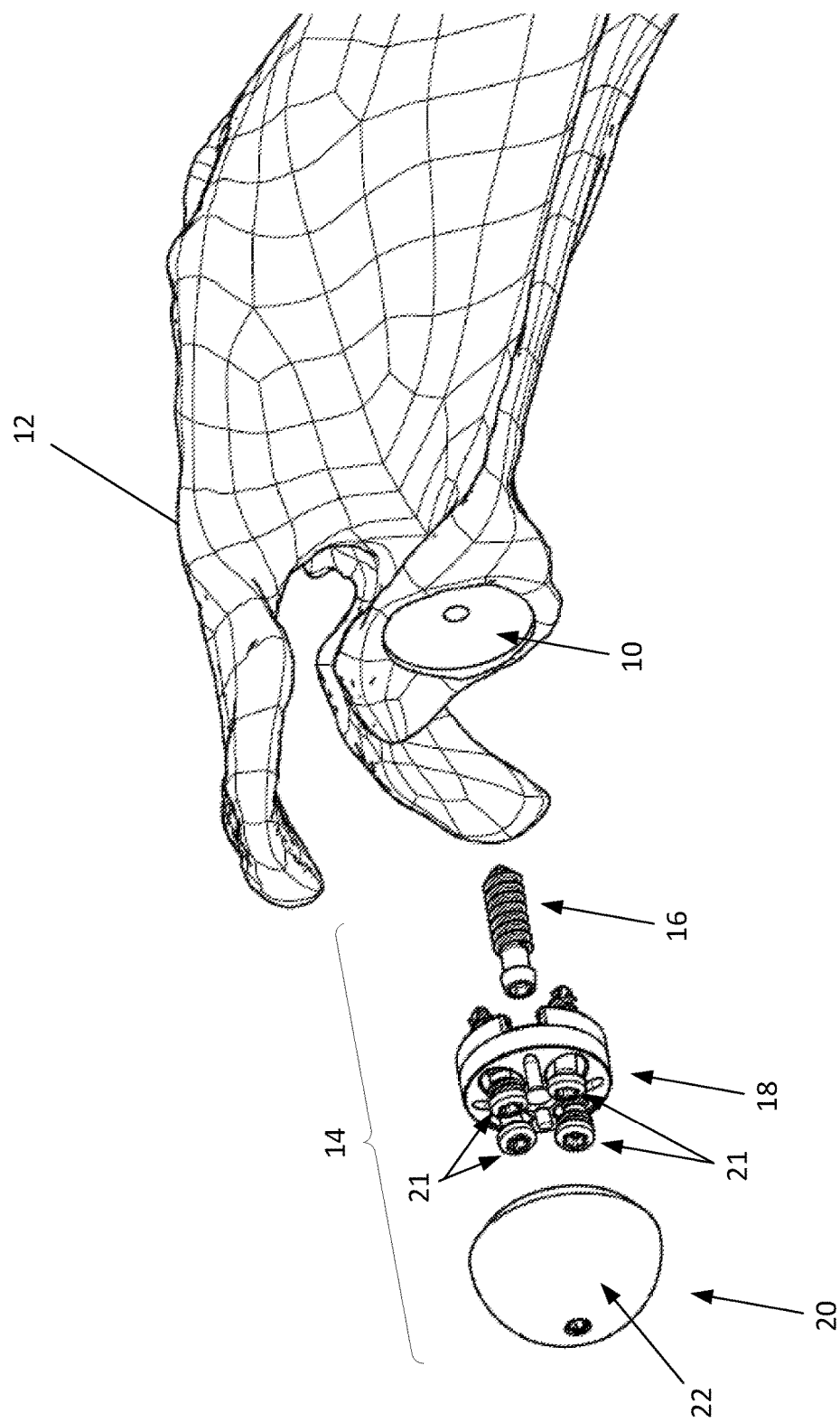
FIG. 1 generally illustrates one example of an implant system in an exploded, unassembled state and an excision site consistent with the present disclosure.

With reference to FIGS. 1-2, a non-limiting example of an implant site 10 formed in a first bone 12 and an implant system 14 is generally illustrated. While aspects/embodiments of the implant site 10 and the implant system 14 may be described in the context of a glenoid excision site formed in the glenoid and a glenoid implant system, it should be appreciated that the implant site 10 may be formed in other bones (e.g., other than the glenoid 12) and the implant system 14 is not limited to a glenoid implant system. As such, the systems and method described herein may be used to form an implant site 10 on any bone 12 and the implant system 14 may be used to repair/replace the articular surface of any bone 12.

The glenoid implant site 10 may be formed in the glenoid 12 in such a manner to aid in the positioning of the glenoid implant system 14 and to reduce and/or prevent movement of the glenoid implant system 14 relative to the glenoid 12. At least a portion of the glenoid implant site 10 may therefore be formed with a shape/contour/profile that inversely corresponds to the shape/contour/profile of at least a portion of the glenoid implant system 14. As described herein, the glenoid implant system 14 may include an anchor 16, an intermediate component, tray, or baseplate 18, and an implant or implant body 20. The anchor 16 may be configured to be secured to the bone 12 within the glenoid implant site 10, the baseplate 18 may be configured to be secured to the anchor 16, and the implant 20 may be configured to be secured to the baseplate 18. Optionally, one or more additional fixation elements (e.g., screws or the like) 21 may be provided to secure the baseplate 18 to the bone 12. The anchor 16, the baseplate 18, and/or the implant 20 may be made from metal such as, but not limited to, cobalt chromium, stainless steel, and/or titanium (and alloys thereof). The baseplate 18 and/or the implant 20 may optionally be made from biocompatible plastic such as, but not limited to, ultra-high-molecular-weight polyethylene (UHMWPE) or the like.

Figure 3:
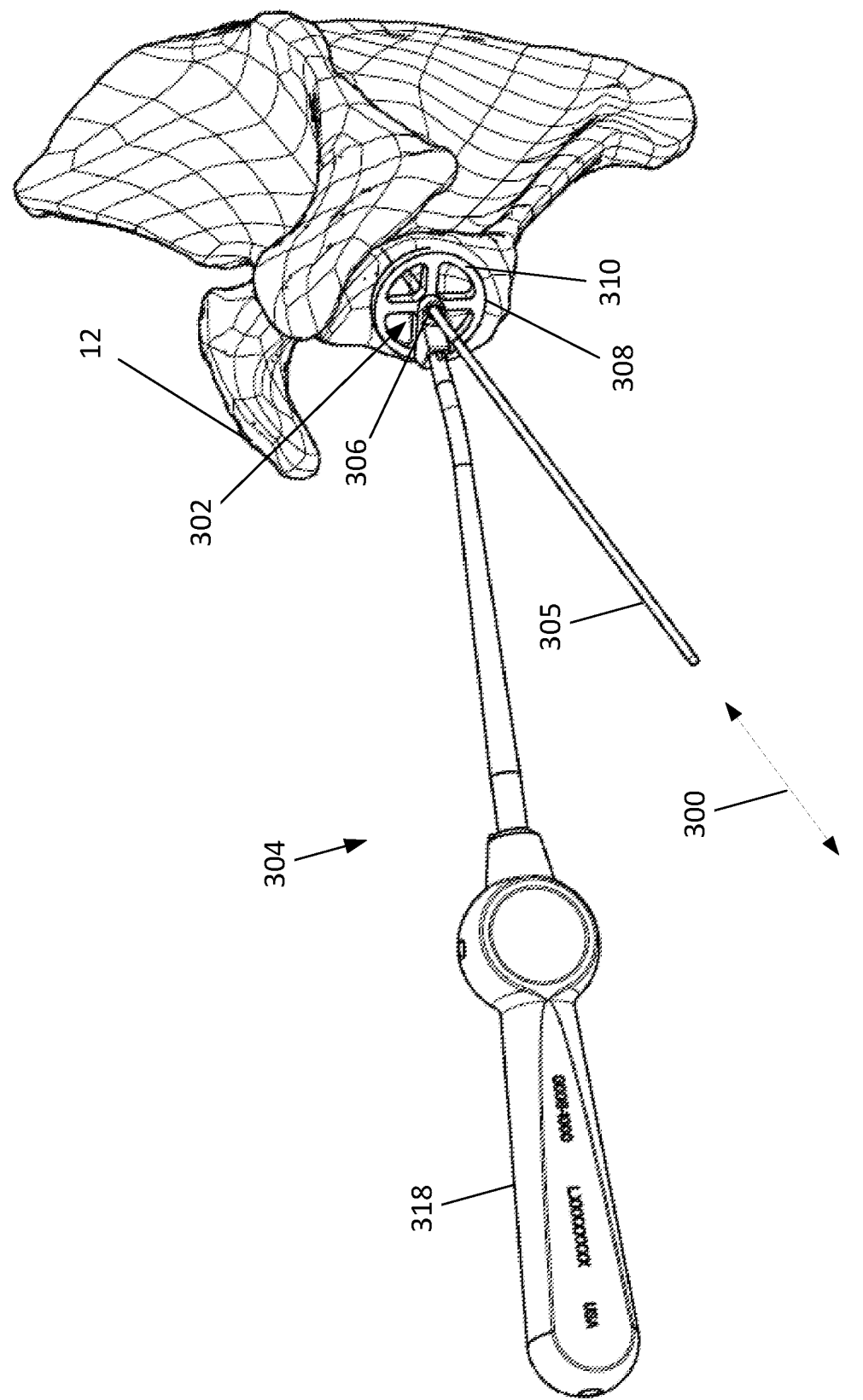
FIG. 3 generally illustrates one example of establishing a working axis consistent with the present disclosure.

As shown, the implant 20 (which may be referred to as a glenosphere in some embodiments) includes a load bearing surface 22 having a generally concaved surface contour (e.g., a reverse shoulder). While aspects/embodiments of the glenoid implant system 14 may be described in the context of a reverse shoulder, it should be appreciated that the glenoid implant system 14 is not limited to a reverse shoulder configuration. As such, the glenoid implant system 14 may include a load bearing surface 22 having any shape/contour/profile such as, but not limited to, a shape/contour/profile that corresponds to the patient's original, native shape/contour/profile. Turning now to FIG. 3, a portion of one example of a system and method for forming the glenoid implant site 10 in the glenoid 12 to mate with the glenoid implant system 14 is generally illustrated. In particular, a working axis 300 may be established. In the illustrated example, the working axis 300 extends at an angle normal to the bottom or lowest point on the patient's native articular surface 302; however, it should be appreciated that the working axis 300 may extend at any angle (which may be greater than or less than 90 degrees) and/or from any point along the patient's native articular surface 302 and/or from other portions of the patient's native articular surface 302.

The working axis 300 may be established using a guide 304. The guide 304 may define a passageway 306 formed in a guide body 308 extending along the working axis 300. The passageway 306 may be configured to receive one or more pins 305 such that the pin 305 may be advanced through the passageway 306 and secured into the bone 12 along the working axis 300, for example, using a drill or the like (not shown for clarity). The passageway 306 may substantially correspond to the cross-section (e.g., diameter) of the outside of the pin 305 to align the pin 305 along the working axis 300. The depth that the pin 305 is secured into the bone 12 may be set using the guide 304. For example, the pin 305 and/or the guide 304 may include indicia (such as, but not limited to, laser markings, windows, shoulders, or the like) that may set the depth of the pin 305 into the bone 12.

The guide body 308 may include a locating ring 310 or the like configured to contact native articular surface 302 and align/position the passageway 306 relative to the native articular surface 302. In the illustrated example, the locating ring 310 has a generally circular shape having a contact surface which substantially continuously contacts the native articular surface 302; however, it should be appreciated that the locating ring 310 is not limited to a generally circular shape nor is does it have to continuously contact the native articular surface 302. For example, the locating ring 310 may include a plurality of discrete portions that contact the native articular surface 302 and/or may have a generally hemispherical shape. The locating ring 310 may therefore have a size and/or shape based on the size and/or shape of the patient's native articular surface 302. The guide 304 may also optionally include a handle 318 configured to allow a surgeon to grasp and position the guide 304 relative to the native articular surface 302.

Figure 4:
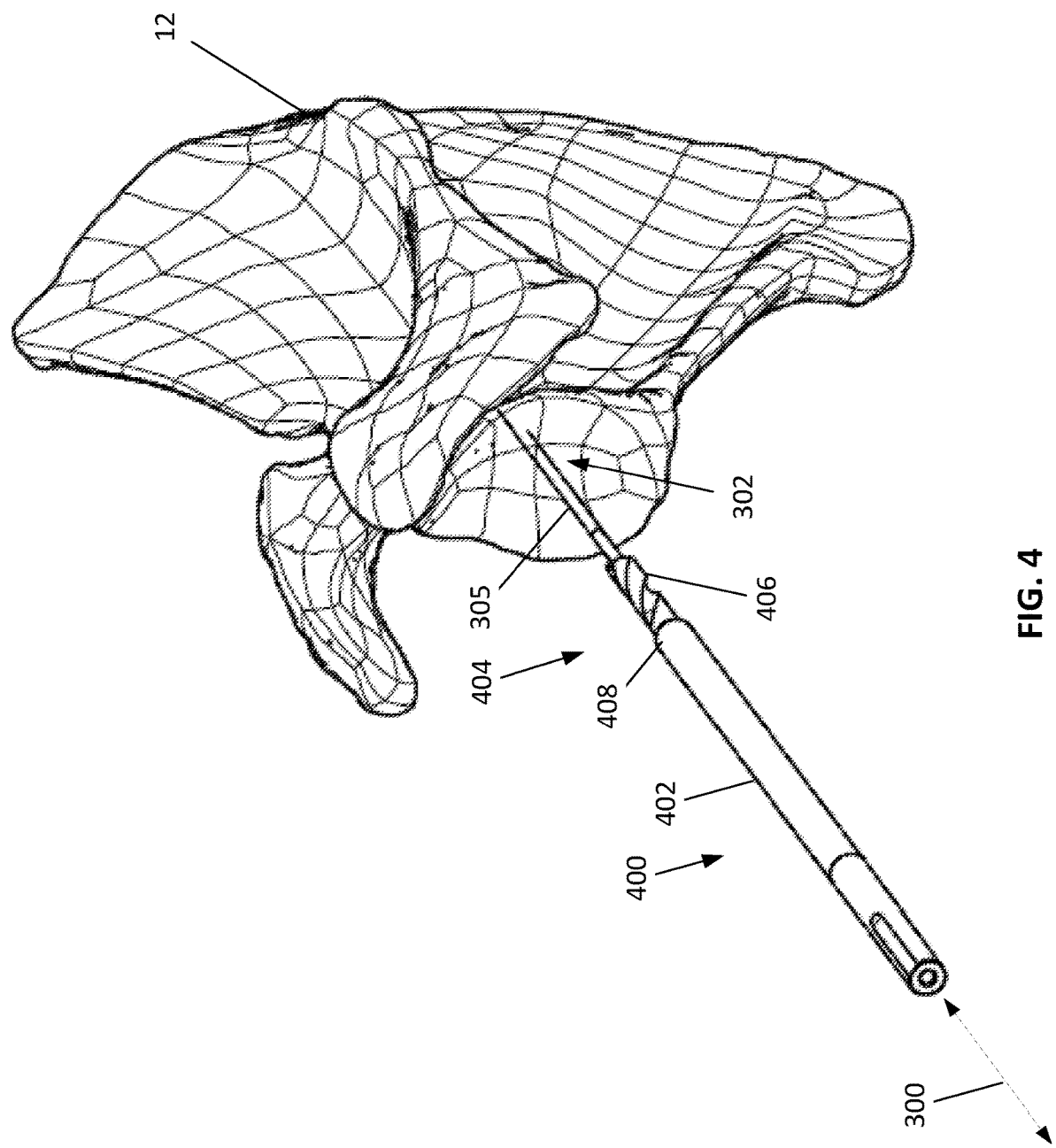
FIG. 4 generally illustrates one example of pilot reamer along the working axis consistent with the present disclosure.
Figure 5:
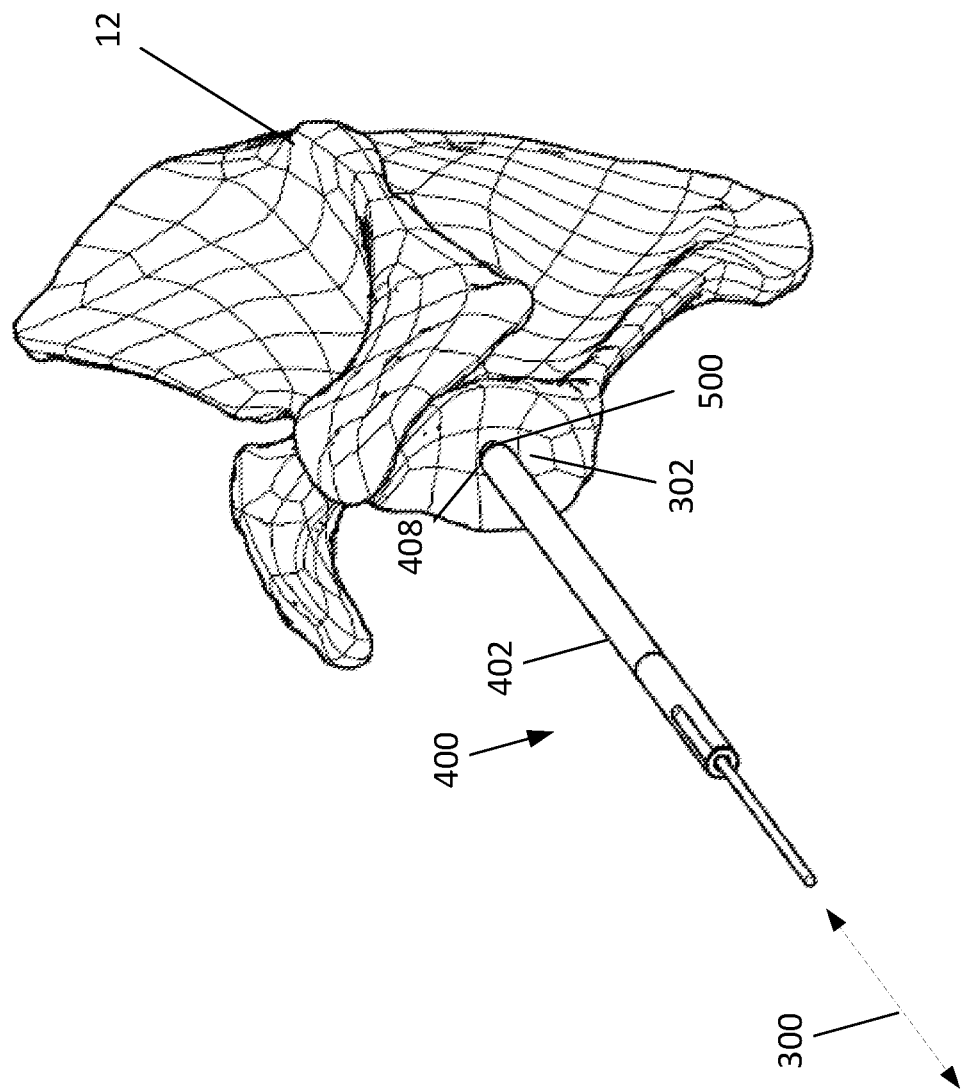
FIG. 5 generally illustrates another view of the pilot reamer along the working axis consistent with the present disclosure.

Once the pin 305 is secured to the bone 12 along the working axis 300, the guide 304 may be removed. Next, a cannulated pilot reamer 400, FIGS. 4-5, may be advanced over the pin 305 and into the bone 12. The cannulated pilot reamer 400 may include a cannulated shaft 402 and a distal end region 404 having a threaded and/or cutting tip 406 configured to form a pilot hole in the bone 12 centered around the working axis 300. The distal end region 304 may also include a shoulder 408. The shoulder 408 may extend radially outward beyond the cross-section (e.g., diameter) of the threaded and/or cutting tip 406. The cross-section (e.g., diameter) of the passageway of the cannulated pilot reamer 400 may substantially correspond to the cross-section (e.g., diameter) of the outside of the pin 305. The depth that the cannulated pilot reamer 400 is advanced into the bone 12, and thus the depth of the pilot hole 500, FIG. 5, formed in the native articular surface 302, may be set using the pin 305 and/or the shoulder 408. For example, the cannulated pilot reamer 400 and/or the pin 305 may include indicate (such as, but not limited to, laser markings, windows, shoulders, or the like) that may set the depth of the cannulated pilot reamer 400 into the bone 12. In one example, the top of the shoulder 408 may be set to be substantially flush with the native articular surface 302 surrounding the cannulated pilot reamer 400.

Figure 6:
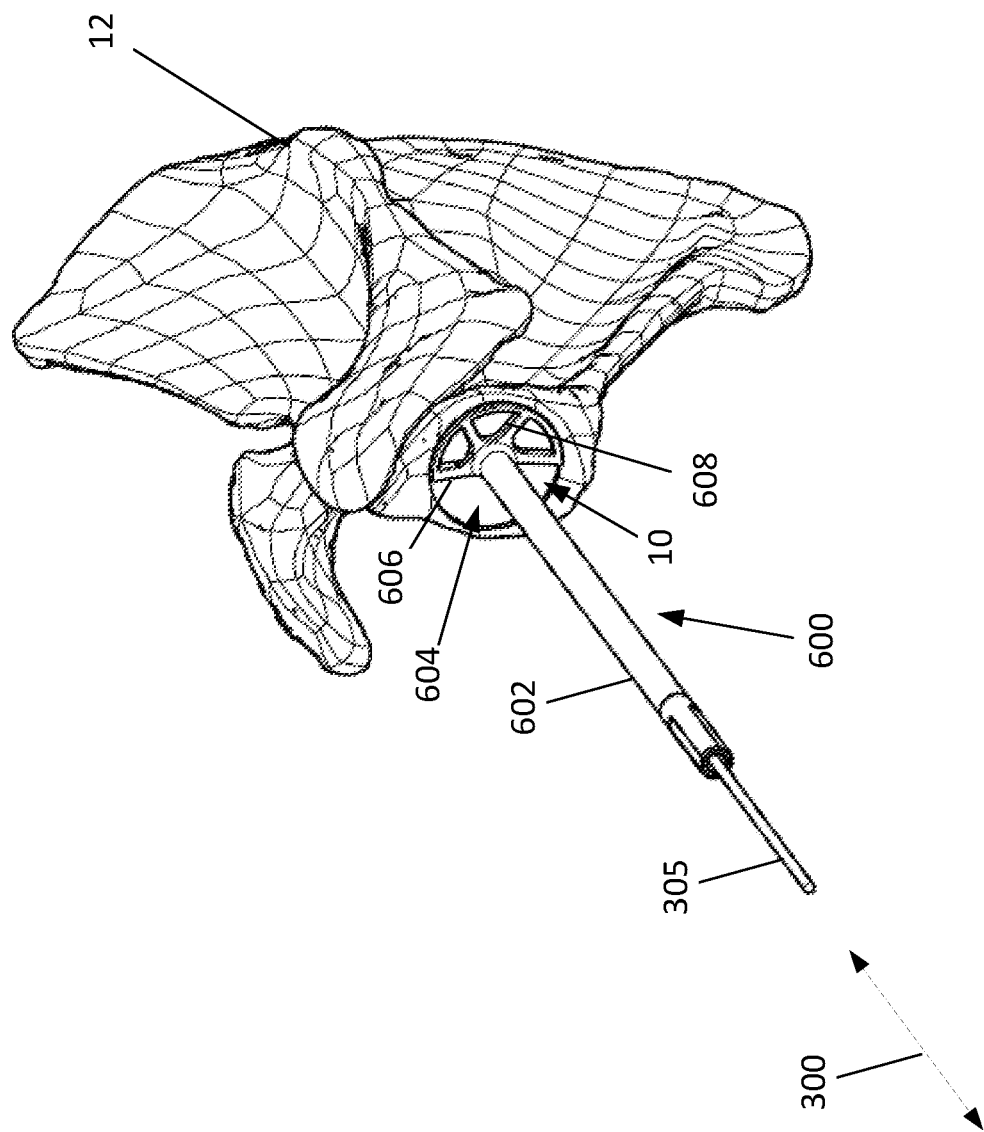
FIG. 6 generally illustrates one example of a reamer along the working axis consistent with the present disclosure.

Turning now FIG. 6, one or more reamers 600 may be rotated and advanced along the working axis 300 to form at least a portion of the glenoid implant site 10. In the illustrated example, the reamer 600 may include a cannulated shaft 602 configured to be rotated and advanced over the pin 305 and/or the cannulated pilot reamer 400. A distal end region 604 of the reamer 600 may include one or more cutting surfaces 606 configured to remove at least a portion of the native articular surface 302. For example, the reamer 600 may include one or more cutting arms 608 extending radially outward from the shaft 602. The cutting arms 608 may include one or more cutting surfaces 606 having a planar and/or an arcuate shape. The shape of the cutting surfaces 606 may be configured to remove at least some of the native articular surface 302 and form at least a portion of the excision site 10 having a generally circular sidewall 705 and base surface 707 (best shown in FIG. 7) revolved around the working axis 300. For example, the cutting surfaces 606 may be configured to form a generally semi-spherical shaped base surface 707 (e.g., convex surface) on the bone 12. Alternatively (or in addition), the cutting surfaces 606 may be formed by two or more tangential curves and/or having one or more inflection points, for example, configured to form a semi-ellipsoidal shaped base surface 707. In at least one example, the depth of the reamer 600 along the working axis 300 may be set/determined using indicia/markings on the pin 305 and/or the cannulated pilot reamer 400. Additional and/or alternative reamers may be used to form all and/or a portion of the excision site 10. Additionally, while the excision site 10 is illustrated having an arcuate (e.g., concaved) surface, the excision site 10 may have any shape such as, but not limited to, convex, planar, combinations of concaved, convex, and/or planar, as well as irregular shapes (which may or may not be revolved around the working axis 300). The excision site 10 may include one or more recesses and/or protrusions. In at least one example, the recesses and/or protrusions may be revolved around the working axis 300. The recesses and/or protrusions may, in at least one example, be formed by the cutting surfaces 606. The recesses and/or protrusions may, in at least one example, inversely correspond to recesses and/or protrusions on the bone facing surface of the baseplate 18 as described herein.

Figure 7:
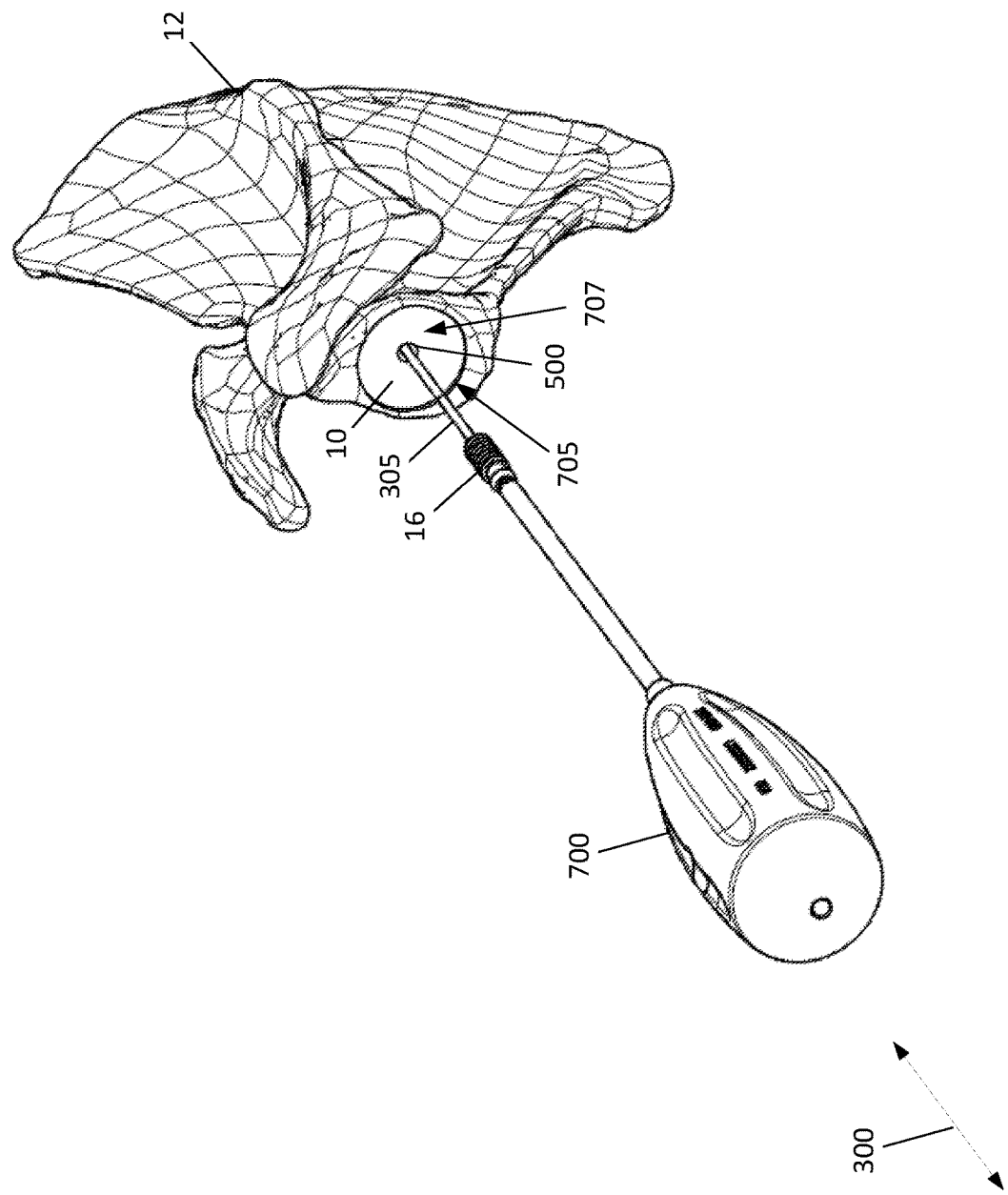
FIG. 7 generally illustrates one example of an anchor along the working axis consistent with the present disclosure.
Figure 8:
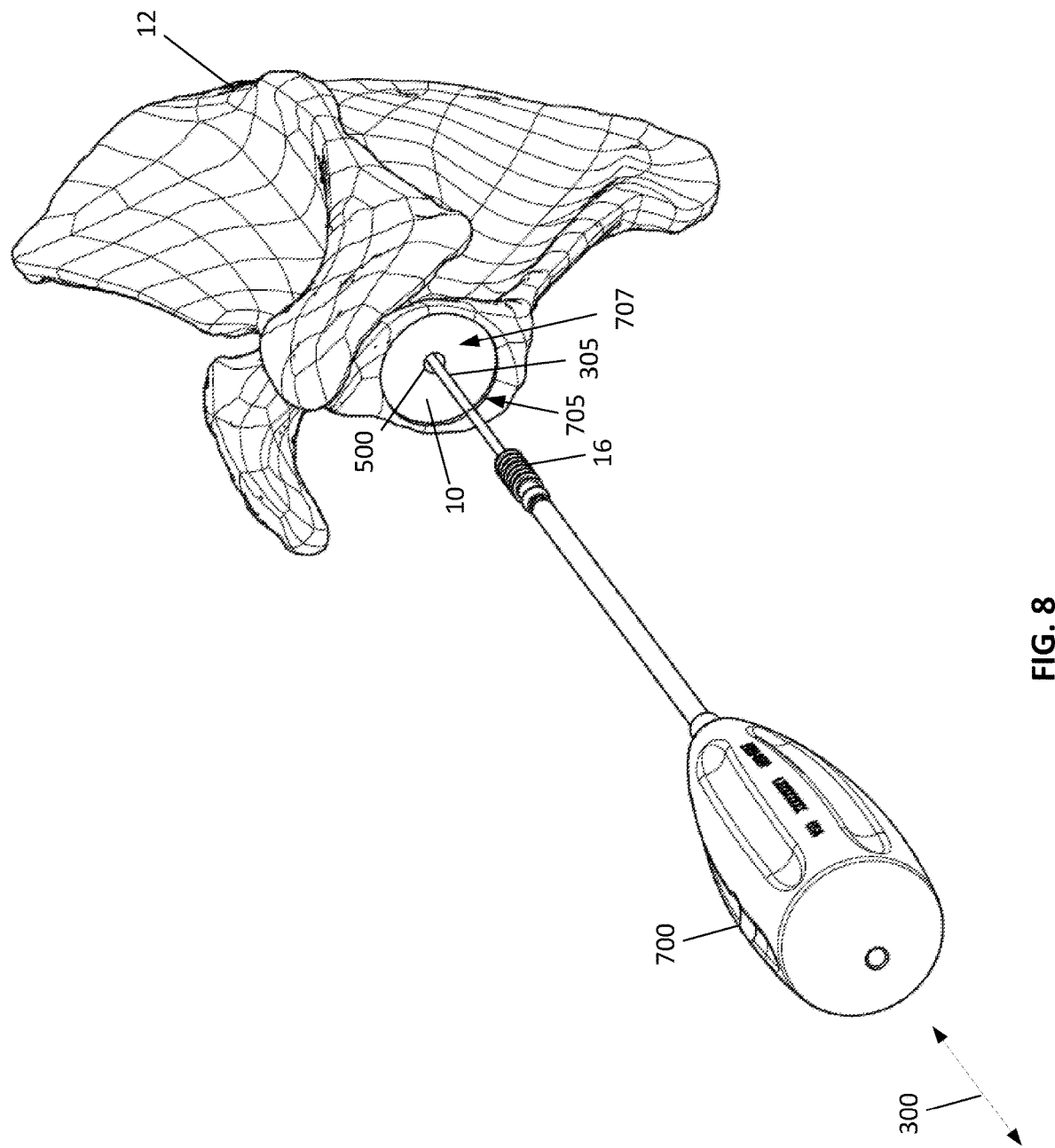
FIG. 8 generally illustrates another view of the anchor along the working axis consistent with the present disclosure.
Figure 9:
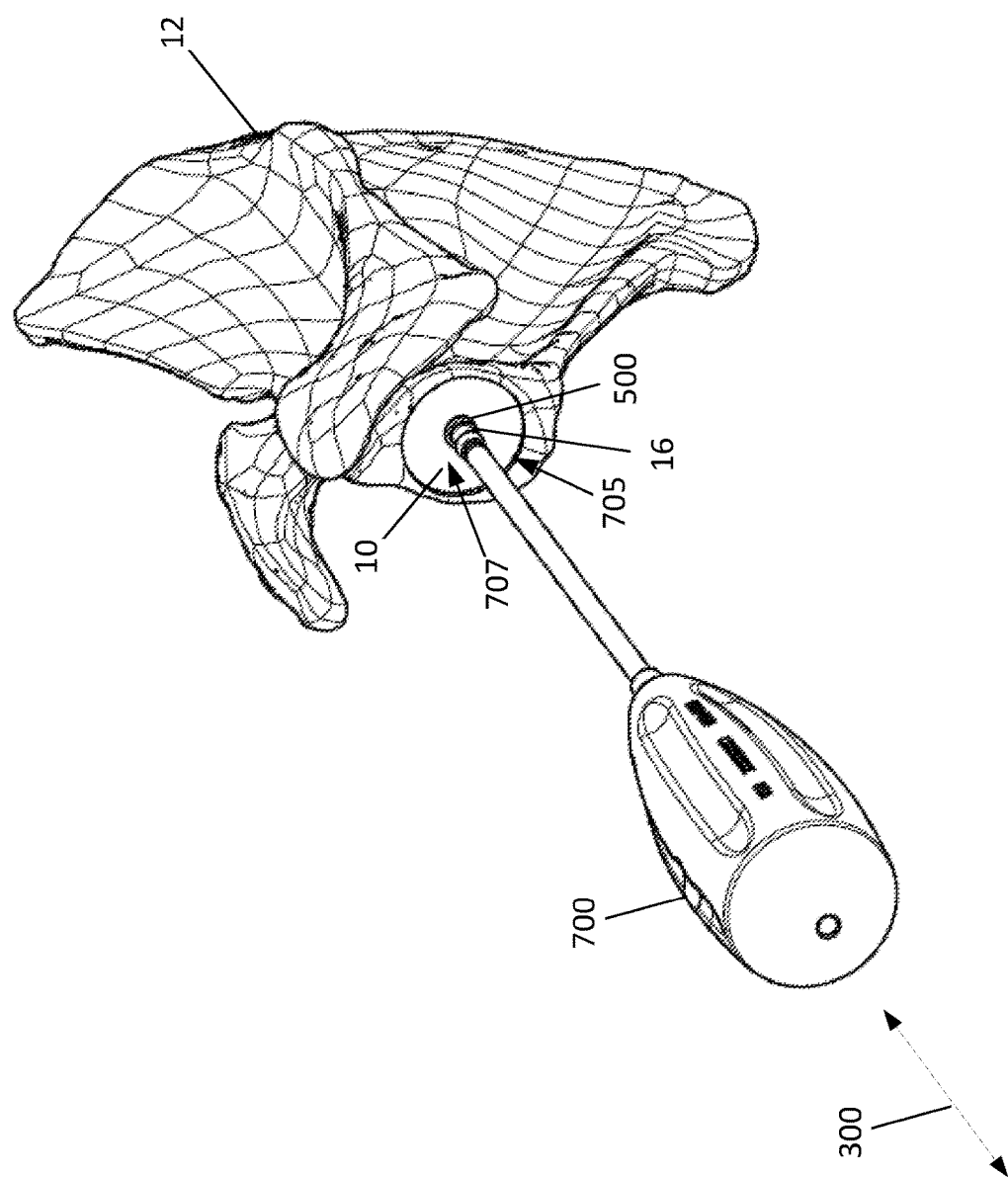
FIG. 9 generally illustrates the anchor being secured to the bone within the excision site along the working axis consistent with the present disclosure.
Figure 10A:
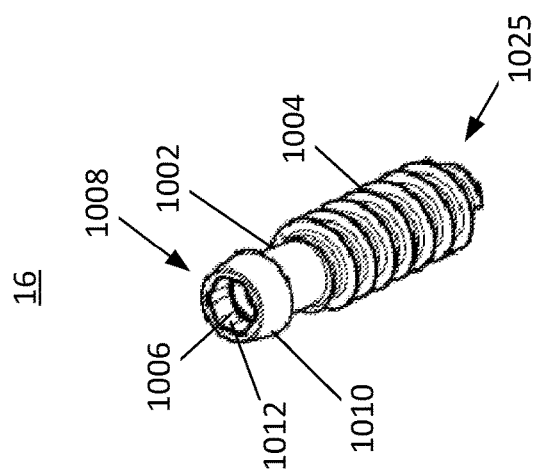
FIGS. 10A-F generally illustrate various views of one example of the anchor consistent with the present disclosure.
Figure 10B:
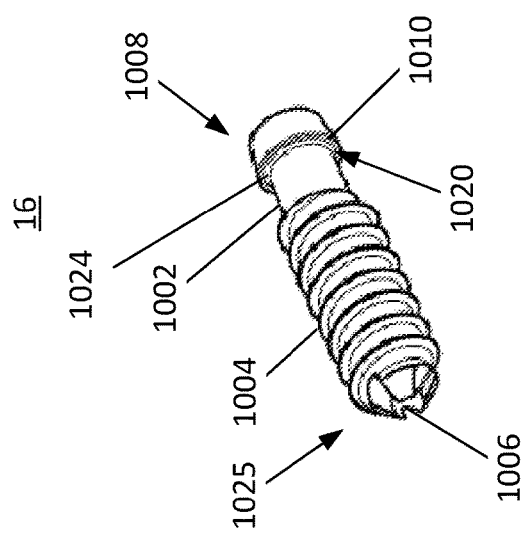
Figure 10C:
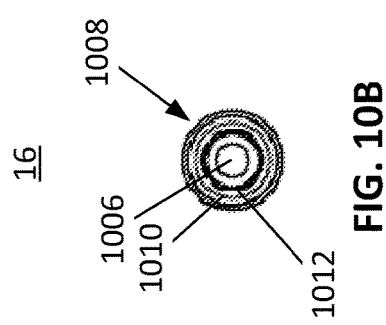
Figure 10D:
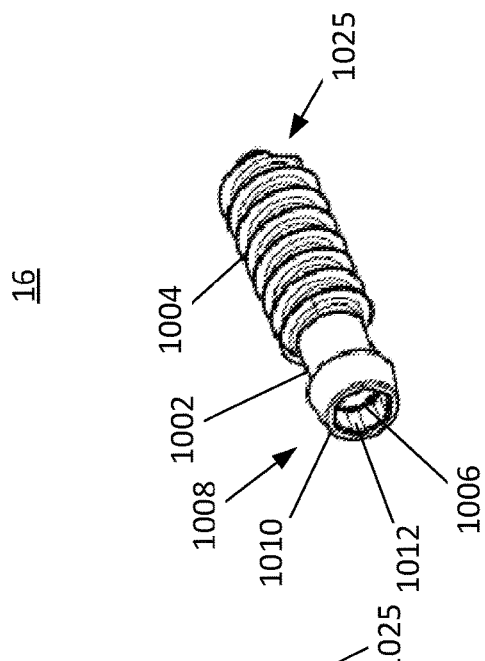
Figure 10E:
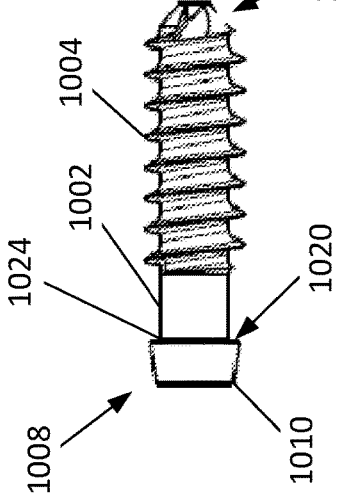
Figure 10F:
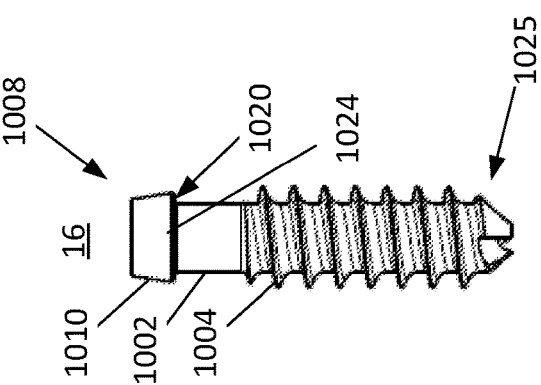

Before and/or after the excision site 10 has been formed, the anchor 16 of the glenoid implant system 14 may be advanced and secured into the bone 12 along the working axis 300, e.g., into the pilot hole 500 as shown in FIGS. 7-9. Turning now to FIGS. 10A-F, various views of one example of an anchor 16 consistent with the present disclosure are generally illustrated. The anchor 16 may include a body 1002, for example, having a straight or tapered profile. The outside of the body 1002 may include one or more retaining elements (such as, but not limited to, threads, protrusions, ribs, barbs, recesses, or the like 1004) configured to engage the bone 12 and secure the anchor 16 to the bone 12. The anchor 16 may optionally be used with bone cement or the like. The outer surface of the anchor 16 may be configured to facilitate bone regrow. The body 1002 may include a cannulated passageway 1006, for example, configured to be advanced over the pin 305.

A proximal end 1008 of the anchor 16 may include a fixation element or head (e.g., an enlarged head) 1010 configured to be coupled to a corresponding fixation element of the baseplate 18 to secure the anchor 16 to the baseplate 18. The enlarged head 1010 may include outer dimensions (e.g., diameters) that are larger than the body or shank region of the anchor 16. The enlarged head 1010 may have a shape configured to be received in a groove of the baseplate 18 as described herein. In at least one example, the enlarged head 1010 may include a tapered outer surface configured to form an interference fit (e.g., a Morse taper or the like) with a corresponding tapered recess in the baseplate 18. Alternatively (or in addition), the enlarged head 1010 may include any other mechanism and/or fastener for either permanently or removably coupling the anchor 16 to the baseplate 18 such as, but not limited to, snap fit connections, threaded connections, adhesives, or the like.

The proximal end 1008 of the anchor 16 may optionally include a driving feature 1012. The driving feature 1012 may be configured to mate with a driver (such as a drill, hand tool, or the like) to secure the anchor 16 into the bone 12. For example, the driving feature 1012 may be configured to allow a drill (e.g., a cannulated drill) to rotate the anchor 16 over the guide pin 305 into the bone 12. In the non-limiting example, the driving feature 1012 is a hex recess.

Referring back to FIGS. 7-9, the anchor 16 may be advanced over the pin 305 using a driver 700 (e.g., a hand drill or the like) having a corresponding driving feature (e.g., a hex head) configured to engage with the driving feature 1012 of the anchor 16. The anchor 16 may therefore be aligned along the working axis 300. In at least one example, the anchor 16 may be aligned substantially perpendicular to the base 707 of the excision site 10; however, it should be appreciated that the anchor 16 may be aligned at other angles. The depth of the anchor 16 within the bone 12 may be set using indicia on the driver 700 and/or pin 305 (such as, but not limited to, laser markings, windows, shoulders, or the like) as generally illustrated in FIG. 9. Alternatively (or in addition), the depth of the anchor 16 within the bone 12 may be set visually by aligning the enlarged head 1010 with the surface of the excision site 10. For example, the anchor 16 may be advanced over the pin 305 such that the base of the enlarged head 1010 is substantially flush with the glenoid implant site 10.

Figure 11:
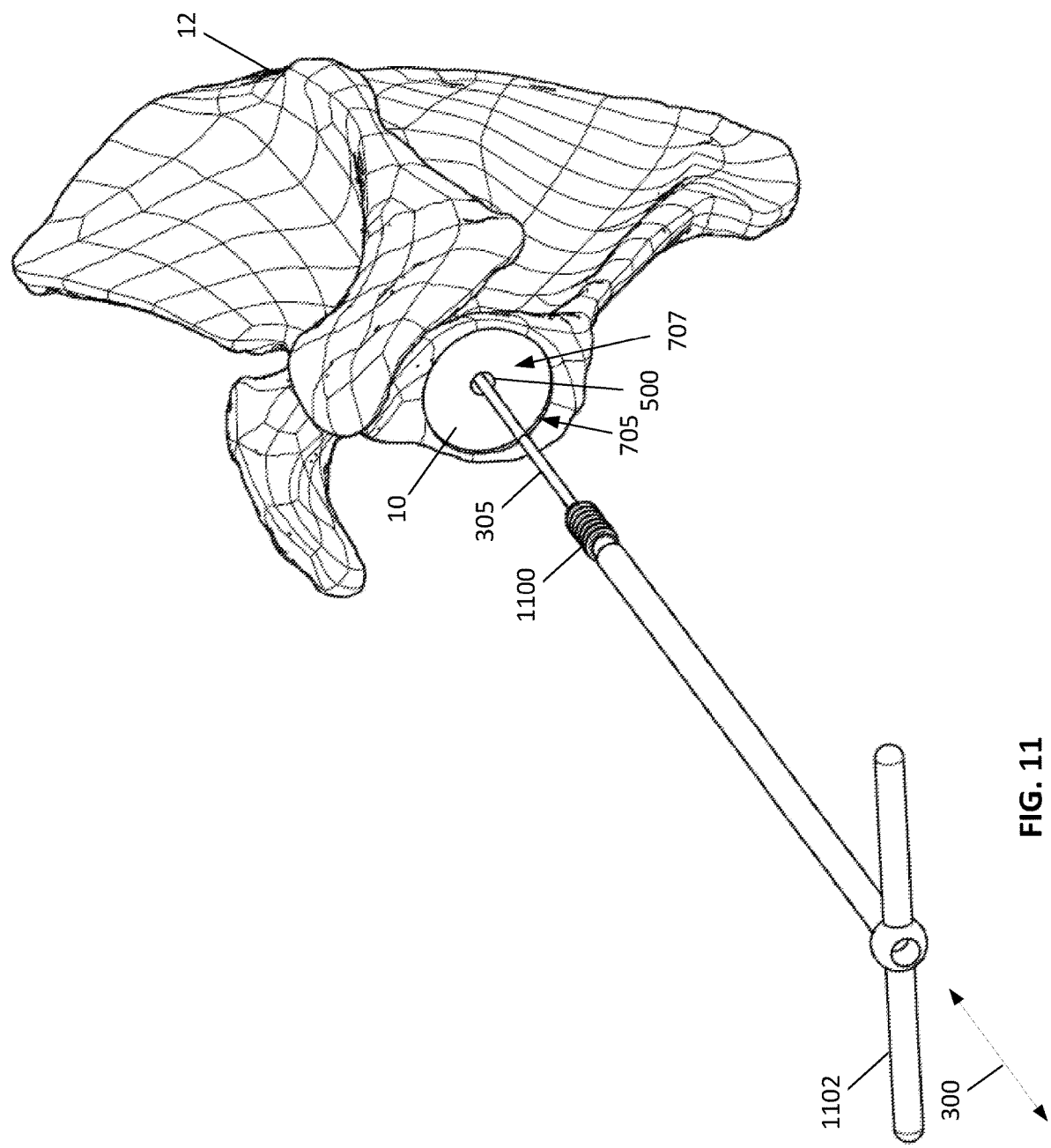
FIG. 11 generally illustrates one example of threading the pilot hole along the working axis consistent with the present disclosure.
Figure 12:
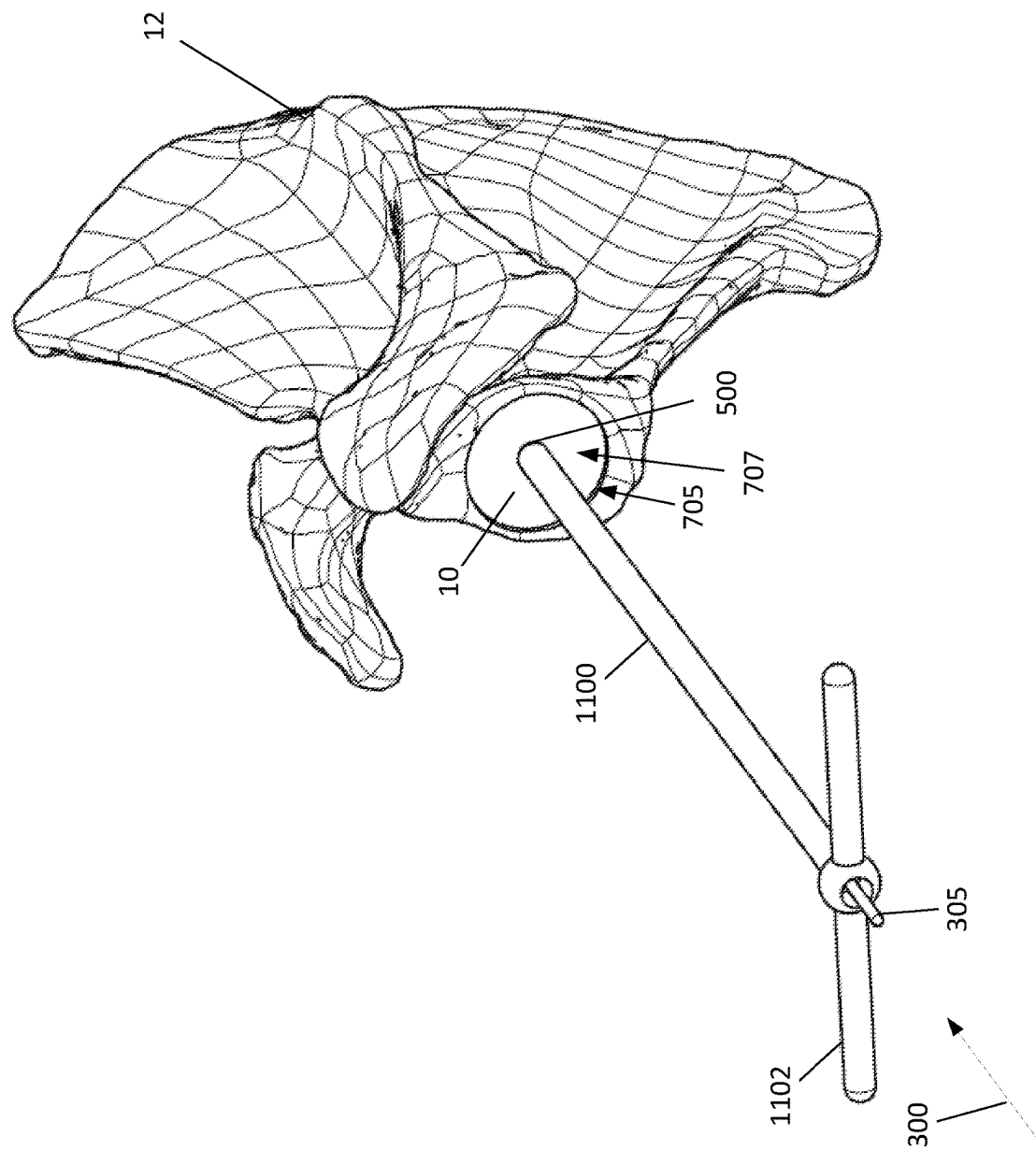
FIG. 12 generally illustrates another view of threading the pilot hole along the working axis consistent with the present disclosure.

Optionally, the pilot hole 500 may be threaded prior to securing the anchor 16 into the bone 12. For example, a tap 1100, FIGS. 11-12, may be advanced into the pilot hole 500. The thread of the tap 1100 and the pilot hole 500 may therefore correspond to the threads 1004 of the anchor 16. The tap 1100 may include, for example, a handle 1102 (such as, but not limited to, a T-handle or the like) configured to rotate the tap 1100 and thread the pilot hole 500 (alternatively, the tap 1100 may be configured to be coupled to a drill or the like). The tap 1100 and the handle 1102 may be cannulated to be advanced over the guide pin 305. It should be appreciated, however, that the pilot hole 500 does not have to be tapped, and that the anchor 16 may include self-tapping threads. In addition, it should be appreciated that the pilot hole 500 may be formed at the same time as the excision site 10, or that the pilot hole 500 may be eliminated.

Figure 13:
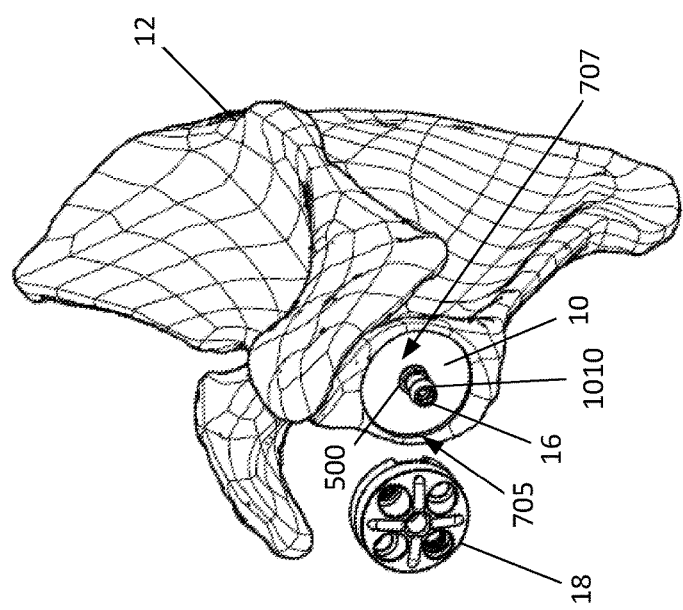
FIGS. 13-14 generally illustrate one example of a baseplate being advanced towards the anchor consistent with the present disclosure.
Figure 14:
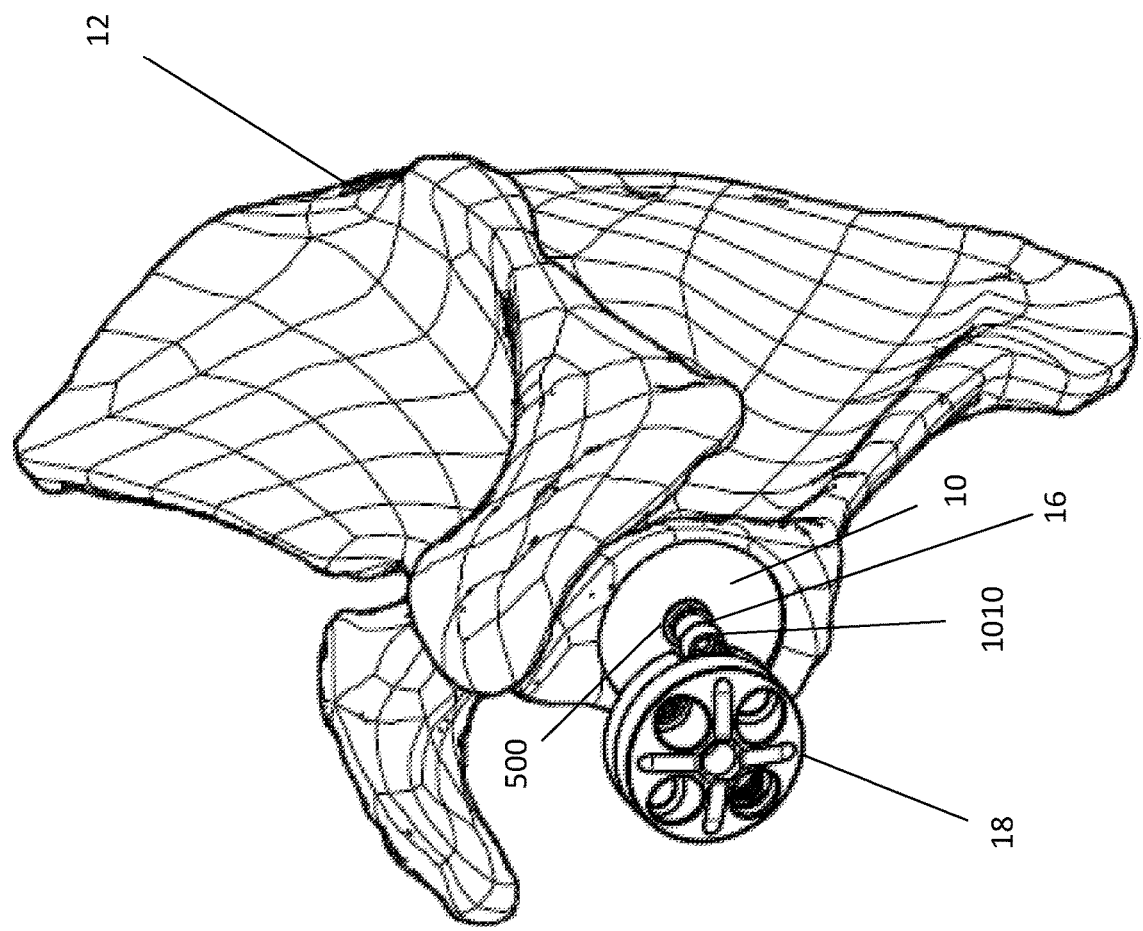

Once the anchor 16 has been secured in the bone 12 within and/or beneath the excision site 10, the baseplate 18 may be coupled to the anchor 16 that is secured in the bone 12, for example, as generally illustrated in FIGS. 13-14. Turning now to FIGS. 15A-E, various views of one example of a baseplate 18 consistent with the present disclosure are generally illustrated. The baseplate 18 may include a body 1502 including a bone facing surface 1504 and an implant facing surface 1506.

The bone facing surface 1504 may have a surface profile/contour that substantially corresponds to the surface profile/contour of the excision site 10. For example, the bone facing surface 1504 may include a sidewall 1508 extending generally upward (e.g., generally towards the implant facing surface 1506) from a base 1510. The sidewall 1508 and the base 1510 may have surface profile/contours that substantially corresponds to the surface profile/contours of the sidewall 705 and the base 707 of the excision site 10, respectively. In at least one example, the sidewall 1508 of the baseplate 18 may have a generally cylindrical shape having a radius that substantially corresponds to the radius of the reamer 600 used to form the excision site. In at least one example, the base 1510 of the baseplate 18 may have a surface profile/contour substantially corresponding to the cutting surface 606 of the reamer 600 revolved around the working axis 300. For example, the base 1510 of the baseplate 18 may have a generally convex shape that inversely corresponds to the generally concaved shape of the base 707 of the excision site 10.

At least a portion of the implant facing surface 1506 of the baseplate 18 may be configured to be coupled to the implant 20. The implant facing surface 1506 may have a generally convex shape configured to be received in at least a portion of the implant 20. For example, the implant facing surface 1506 may include an implant interface surface having a tapered shape that configured to form a tapered interference connection (e.g., a Morse taper or the like) with at least a portion of the baseplate recess 24 (FIG. 2) of the implant 20. In the illustrated example, the implant facing surface 1506 may have a generally convex shape that generally inversely corresponds to at least a portion of the baseplate recess 24 of the implant 20. Of course, the baseplate 18 may be coupled to the implant 20 in any manner known to those skilled in the art such as, but not limited to, by way of one or more threaded connections, snap connections, adhesives, or the like.

In the illustrated example, the implant facing surface 1506 extends from a transition 1512 with the bone facing surface 1504. The transition 1512 may extend around the outer periphery/perimeter of the baseplate 18. Below the transition 1512, the bone facing surface 1504 may be generally received within the excision site 10, while above the transition 1512, at least a portion of the baseplate 18 (e.g., at least a portion of the implant facing surface 1506) may be secured to the implant 20. Of course, the bone facing surface 1504 and the implant facing surface 1506 do not have to extend from the transition 1512. To this end, baseplate 18 may include an intermediate surface disposed between the bone facing surface 1504 and the implant facing surface 1506 which does not form part of the bone facing surface 1504 and the implant facing surface 1506.

The baseplate 18 may have a thickness configured to position the implant 20 at the desired position relative to the bone 12. The implant facing surface 1506 of the body 1502 of the baseplate 18 may have a generally frusto-conical and/or frusto-spherical shape. In at least one example, the generally frusto-conical and/or frusto-spherical shape may be configured to allow the implant 20 to be rotated relative to the excision site 10, baseplate 18, and/or anchor 16, e.g., to align the implant 20 in a particular and/or predetermined relationship relative to the bone 12. This may be particularly useful in an embodiment in which the articulating surface or load bearing surface 22 of the implant 20 is not symmetrical.

Figures 16A, 16B, 16C:
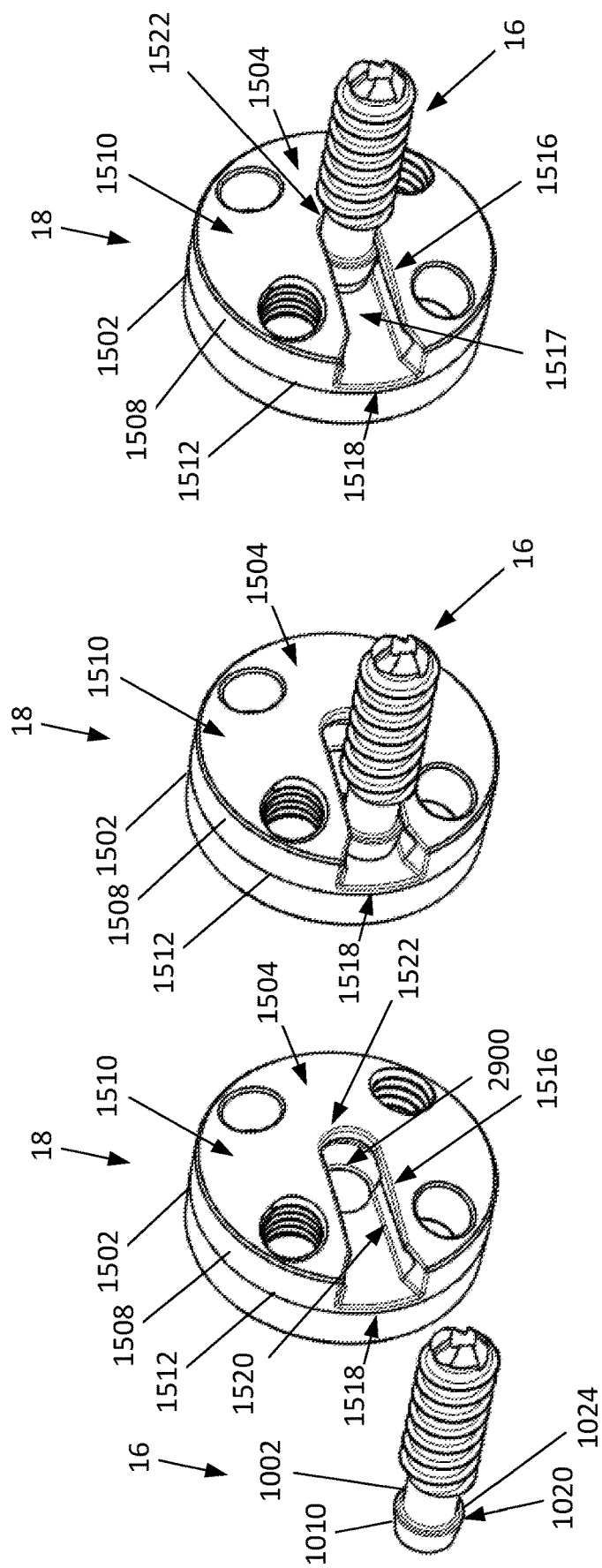
FIGS. 16A-16C generally illustrate various views of one example of the baseplate being advanced over the anchor consistent with the present disclosure.

The baseplate 18 also includes a channel 1516, for example, extending from an outer periphery of the body 1502. The channel 1516 is configured to receive the enlarged head 1010 and a portion of the shank 1002 of the anchor 16 (e.g., as generally illustrated in FIGS. 16A-16B). In particular, the channel 1516 may have a cross-section generally corresponding to the cross-section of the enlarged head 1010 and a portion of the shank 1002 such that the enlarged head 1010 and a portion of the shank 1002 can be received through an entrance 1518 of the channel 1516 and enter into the channel 1516, but once inside the channel 1516, cannot be removed from the channel 1516 other than through the entrance 1518.

The channel 1516 may extend radially from the outer periphery of the body 1502 to a central region (e.g., a center) of the baseplate 18. In at least one example, the channel 1516 may be formed at least in part in bone facing surface 1504 of the body 1502. For example, a lateral entrance 1518 may be formed in the sidewall 1508 of the bone facing surface 1504 while the slot/open region 1517 of the channel 1516 may be formed by the base 1510 of the bone facing surface 1504. The entrance 1518 may have a larger cross-section than the enlarged head 1010, and may be tapered, to facilitate alignment and advancement of the enlarged head 1010 through the entrance 1518 and into the channel 1516. The taper may include a taper that increases closer to the bone facing surface 1504 and/or a taper that decreases closer to the bone facing surface 1504, and may inversely correspond to the taper of the enlarged head 1010. The channel 1516 may include interior surfaces 1520 forming an undercut (e.g., having a concaved profile). In one example, at least a portion of the interior surfaces 1520 (e.g., the bottom portion) generally corresponds to the cross-section of the enlarged head 1010 (e.g., the taper of the enlarged head 1010). The interior surfaces 1520 of the channel 1516 may also be configured to facilitate alignment and advancement of the enlarged head 1010 through the channel 1516, e.g., as generally illustrated in FIGS. 16A-16C. The slot/open region 1517 of the channel 1516 may generally correspond to the cross-section of the shank 1002 of the anchor 16.

A distal end region 1522 (FIGS. 15A-16C) of the channel 1516 includes a recess or pocket 1524 (see also FIG. 29B). The recess/pocket 1524 is configured to receive at least a portion of the enlarged head 1010 of the anchor 16. In at least one example, the enlarged head 1010 (see, e.g., FIGS. 10A-F) may include an anchor engagement surface 1020 configured to engage with a corresponding baseplate engagement surface 1526 (see, e.g., FIGS. 15A-D and FIG. 29B) of the recess/pocket 1524. For example, the anchor engagement surface 1020 may include a shoulder 1024 having a cross-section (e.g., a diameter) that substantially corresponds to the cross-section (e.g., a diameter) of the baseplate engagement surface 1526 of the recess/pocket 1524. At least one embodiment, the baseplate engagement surface 1526 of the recess/pocket 1524 may form a generally cylindrical recess/pocket. Alternatively (or in addition), the anchor engagement surface 1020 may include a taper that substantially corresponds to a taper of the baseplate engagement surface 1526 of the recess/pocket 1524 to form a tapered interference connection (e.g., a Morse taper or the like).

In the illustrated example, the baseplate 18 is formed as a single component; however, the baseplate 18 may be formed from two or more components. For example, the baseplate 18 may include a bone facing component comprising the bone facing surface 1504 and an implant facing component comprising the implant facing surface 1506. The bone facing component may be configured to be secured (either permanently or removably) to the implant facing surface in any manner known to those skilled in the art. The channel 1516 and/or the driver passageway 1530 may optionally be formed only in the bone facing component.

With reference now to FIG. 14 and FIGS. 16A-C, once the anchor 16 has been secured to the bone 12, the enlarged head 1010 of the anchor 16 may be advanced through the entrance 1518 (e.g., FIG. 16B) and into the channel 1516 until the enlarged head 1010 is proximate the recess/pocket 1524

Figure 17:
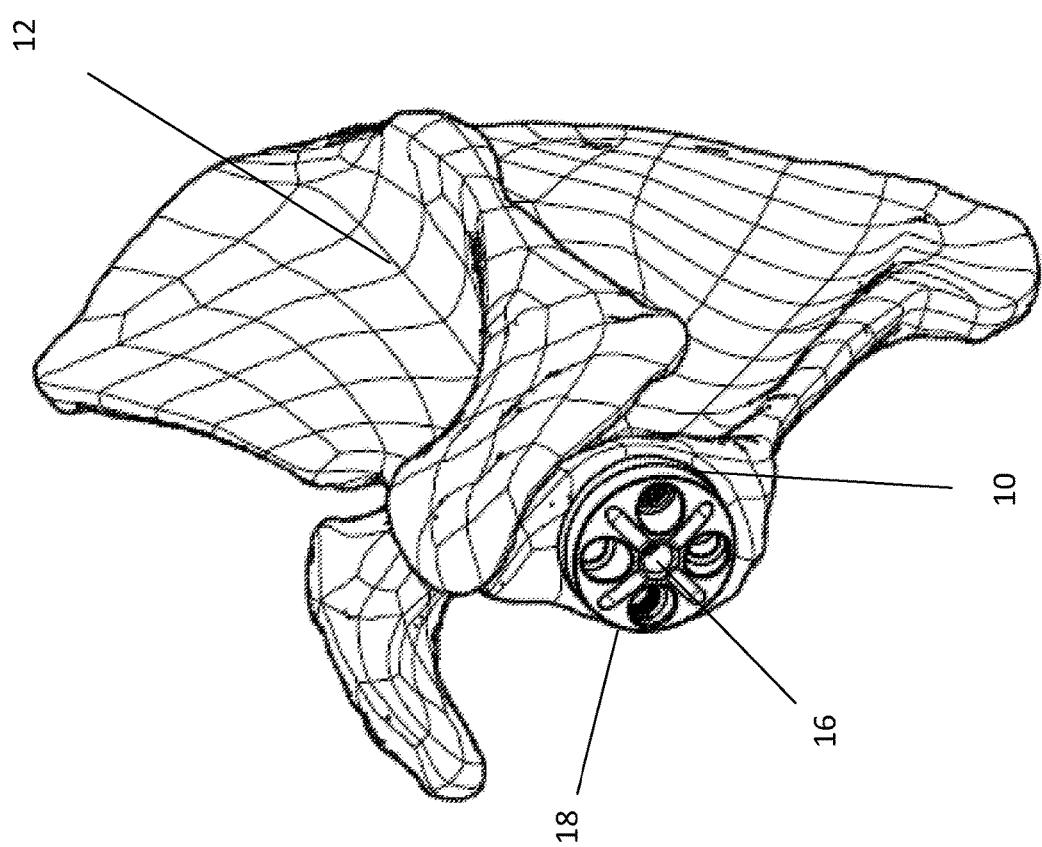
FIG. 17 generally illustrates one example of the baseplate coupled to the anchor consistent with the present disclosure.
Figure 18:
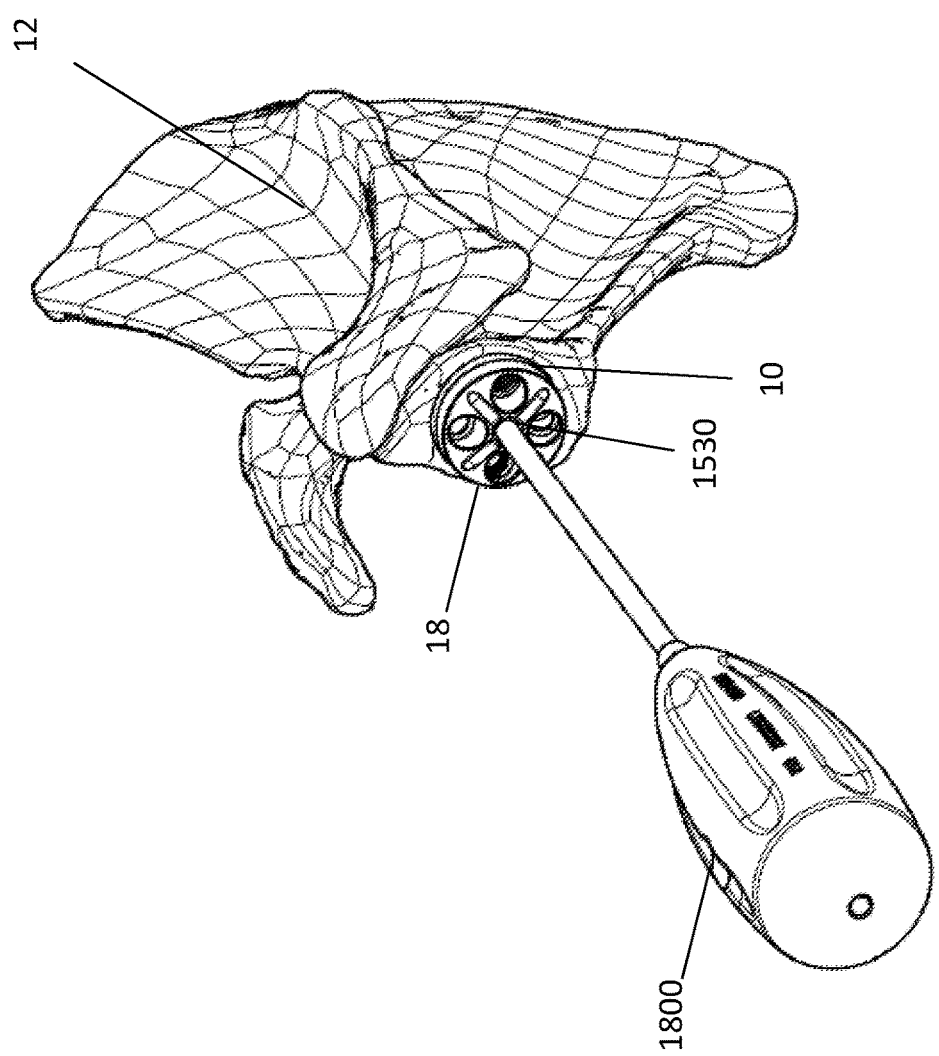
FIG. 18 generally illustrates one example of securing the baseplate to the anchor consistent with the present disclosure.

(e.g., FIG. 16C). Once the enlarged head 1010 is proximate the recess/pocket 1524, the anchor 16 may be secured to the baseplate 18 as generally illustrated in FIG. 17. In one example, the baseplate 18 may include a driver passageway 1530, FIGS. 15A-15D, extending from a top surface of the baseplate 18 (e.g., the implant facing surface 1506) to the channel 1516. The driver passageway 1530 may be configured to allow a driver 1800, FIG. 18, to be advanced therein and engage a portion of the anchor 16. For example, the driver 1800 may include a driving feature (such as, but not limited to, a hex head or the like) configured to mate with the driving feature 1012 of the anchor 16 as generally described herein. The driver 1800 may be configured to rotate the anchor 16 into the bone 12, and to cause the enlarged head 1010 of the anchor 16 to engage the baseplate 18. For example, rotation of the anchor 16 may cause the anchor 16 to be advanced into the recess/pocket 1524 such that the anchor engagement surface 1020 engages with (e.g., contacts) the corresponding baseplate engagement surface 1526 of the recess/pocket 1524 (see, e.g., FIGS. 16C and 29B). In particular, rotation of the anchor 16 may cause the enlarged head 1010 to urge the bone facing surface 1504 of the baseplate 18 (e.g., the base 1510) against the base 707 of the excision site 10. As may be appreciated, the sidewalls 705 of excision site 10 may also engage against the bone facing surface 1504 of the baseplate 18 (e.g., the sidewall 705) to prevent lateral movement of the baseplate 18 relative to the bone 12. In addition, rotation of the anchor 16 may cause the anchor engagement surface 1020 to engage (e.g., contact) the corresponding baseplate engagement surface 1526 of the recess/pocket 1524 to prevent separation of the baseplate 18 from the anchor 16.

Figure 19:
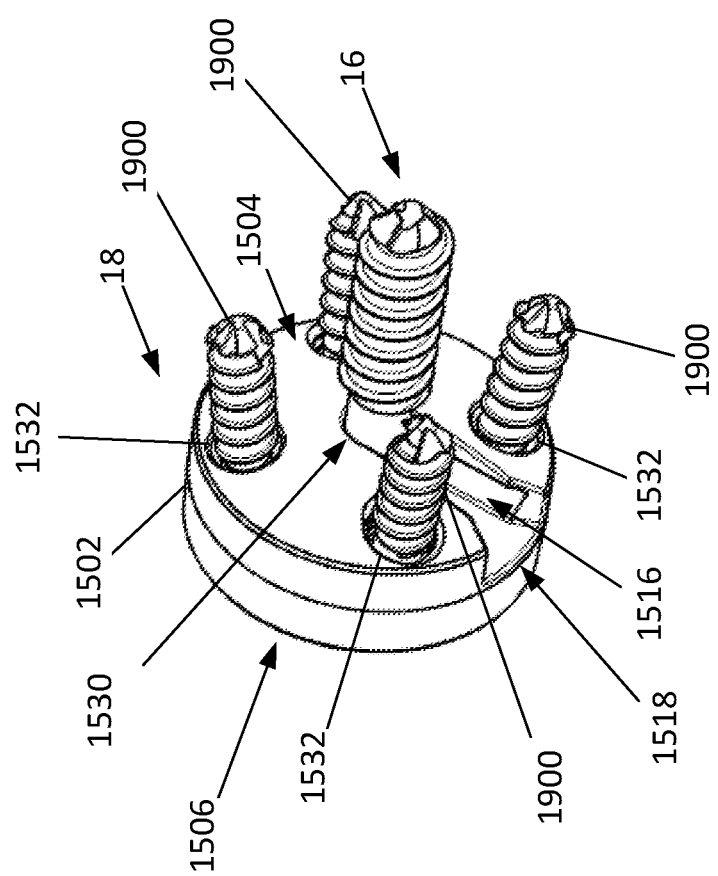
FIG. 19 generally illustrates one example of the baseplate secured to the anchor consistent with the present disclosure.
Figure 20:
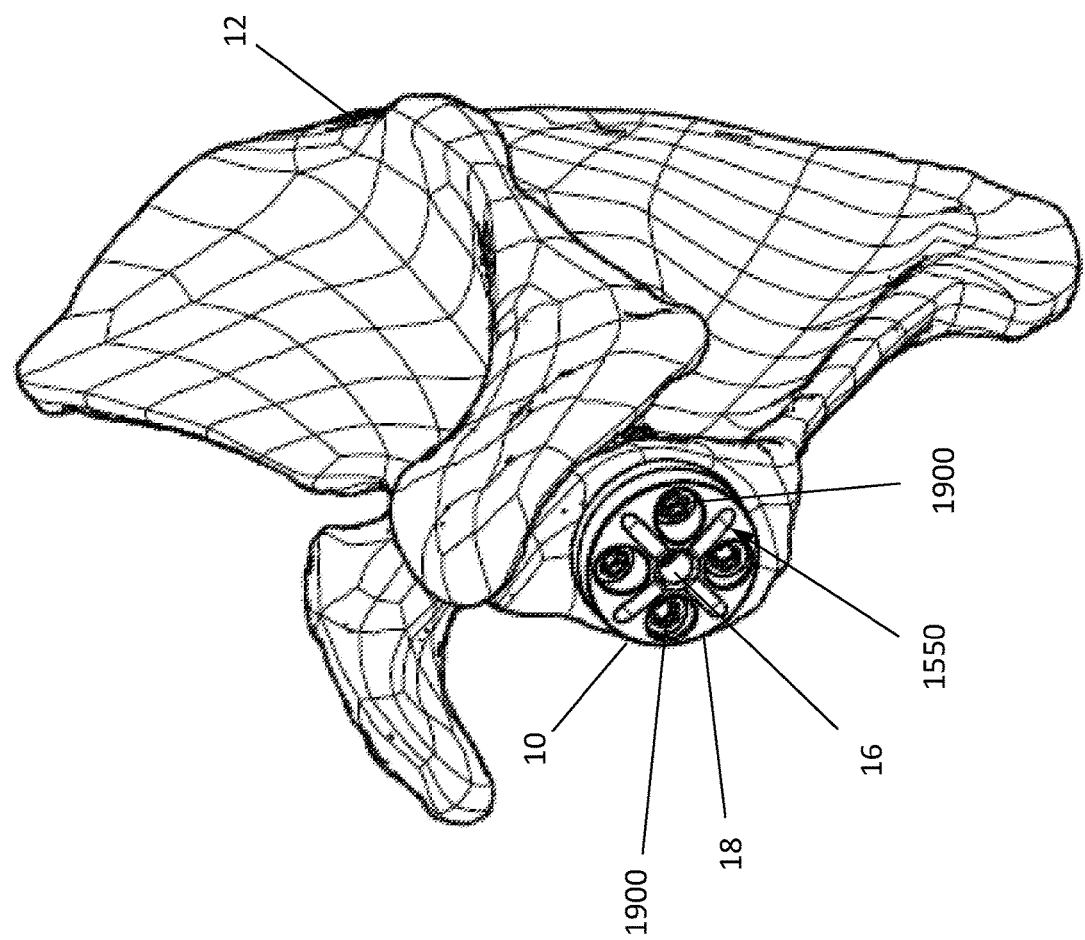
FIG. 20 generally illustrates one example of the baseplate secured to the bone using one or more additional fasteners consistent with the present disclosure.

Optionally, additional fasteners may be provided to aid in securing the baseplate 18 to the bone 12. For example, one or more bone screws 1900, FIGS. 19-20, may aid in securing the baseplate 18 to the bone 12. The bone screws 1900 may be advanced through apertures 1532 (best seen in FIGS. 15A-15D) formed in the body 1502 of the baseplate 18. In at least one example, the apertures 1532 may extend from the bone facing surface 1504 to the implant facing surface 1506. One or more of the apertures 1532 and/or the bone screws 1900 may be aligned at an acute angle relative to the working axis 300 and/or the anchor 16. Alternatively (or in addition), one or more of the apertures 1532 and/or the bone screws 1900 may be aligned substantially parallel to the working axis 300 and/or the anchor 16. Optionally, one or more of the apertures 1532 may include threads configured to engage with the threads of the bone screws 1900 to form locking threads and/or self-locking threads configured to generally prevent the bone screw 1900 from backing out of the bone 12.

Figure 21:
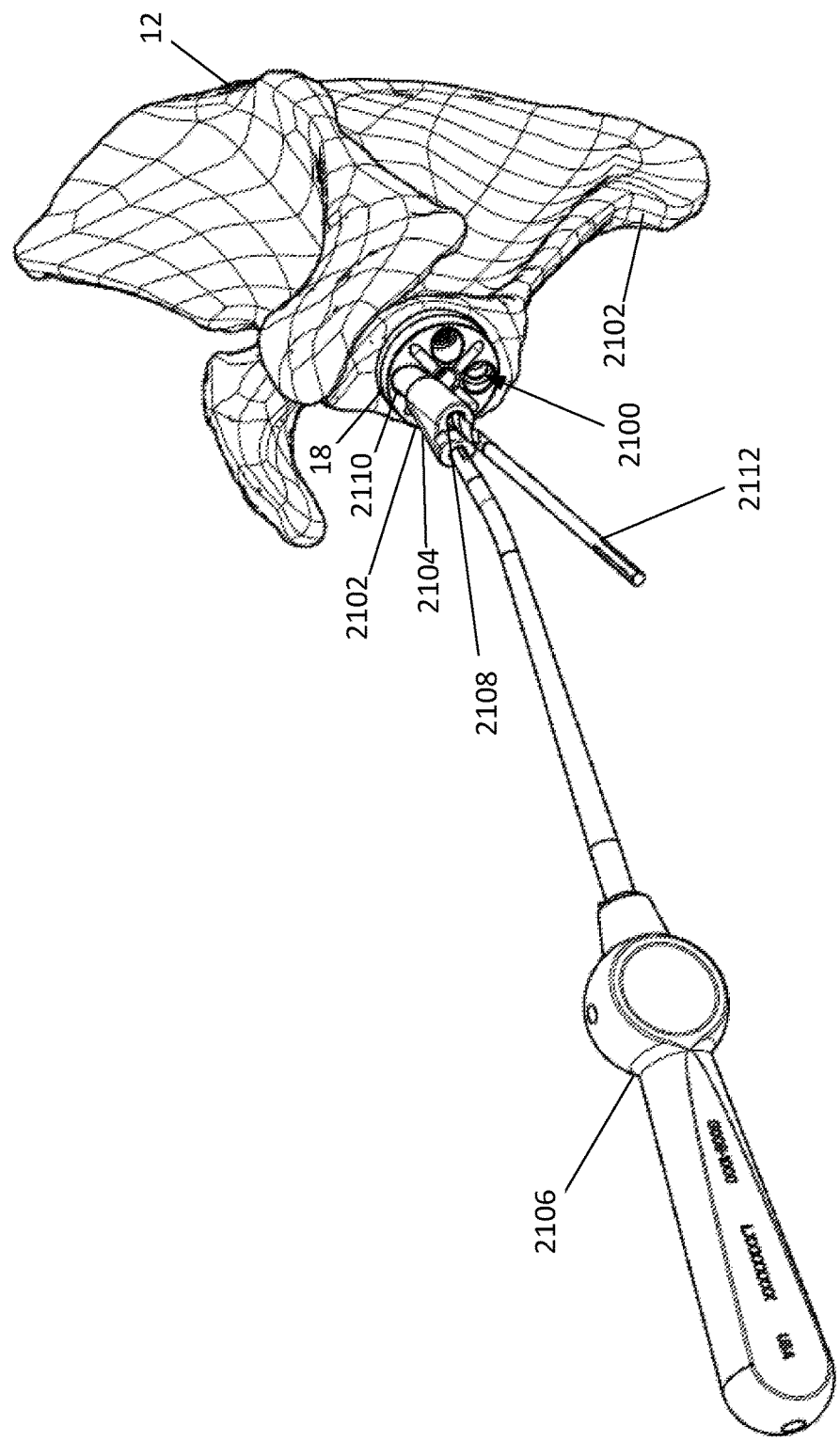
FIG. 21 generally illustrates one example of a guide for forming pilot holes for securing the baseplate to the bone using one or more additional fasteners consistent with the present disclosure.
Figure 22:
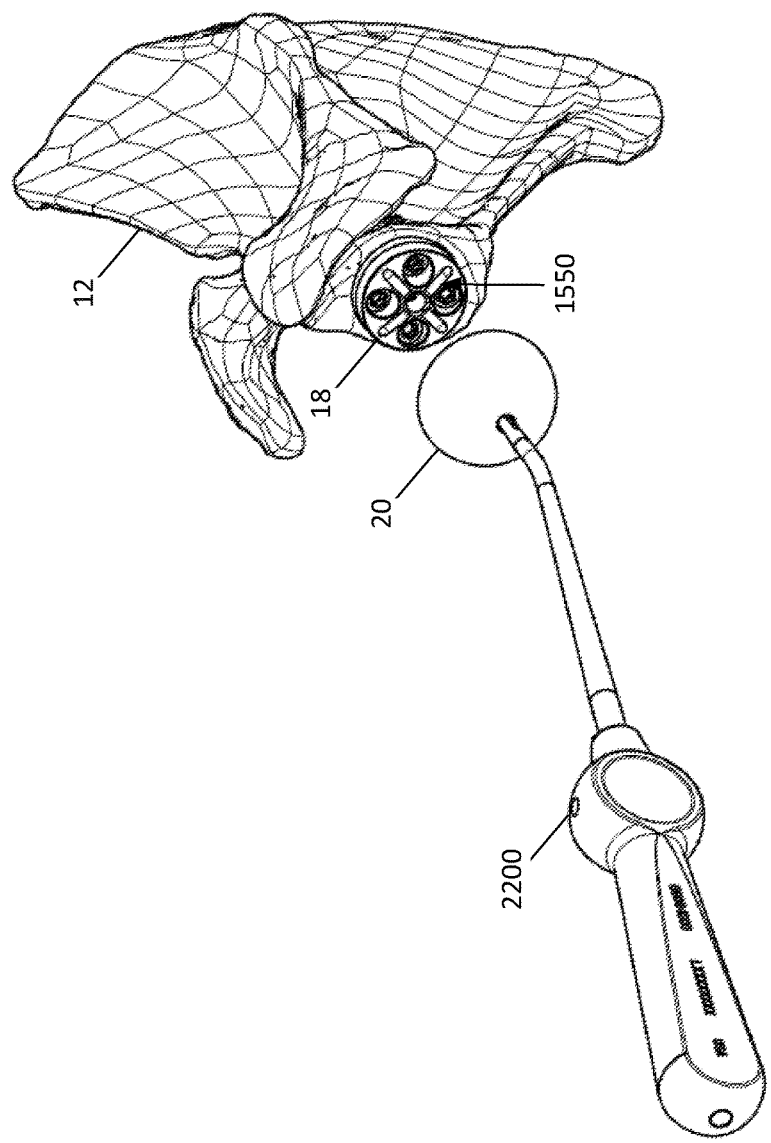
FIGS. 22-24 generally illustrate one example of an implant being advanced towards the baseplate consistent with the present disclosure.
Figure 23:
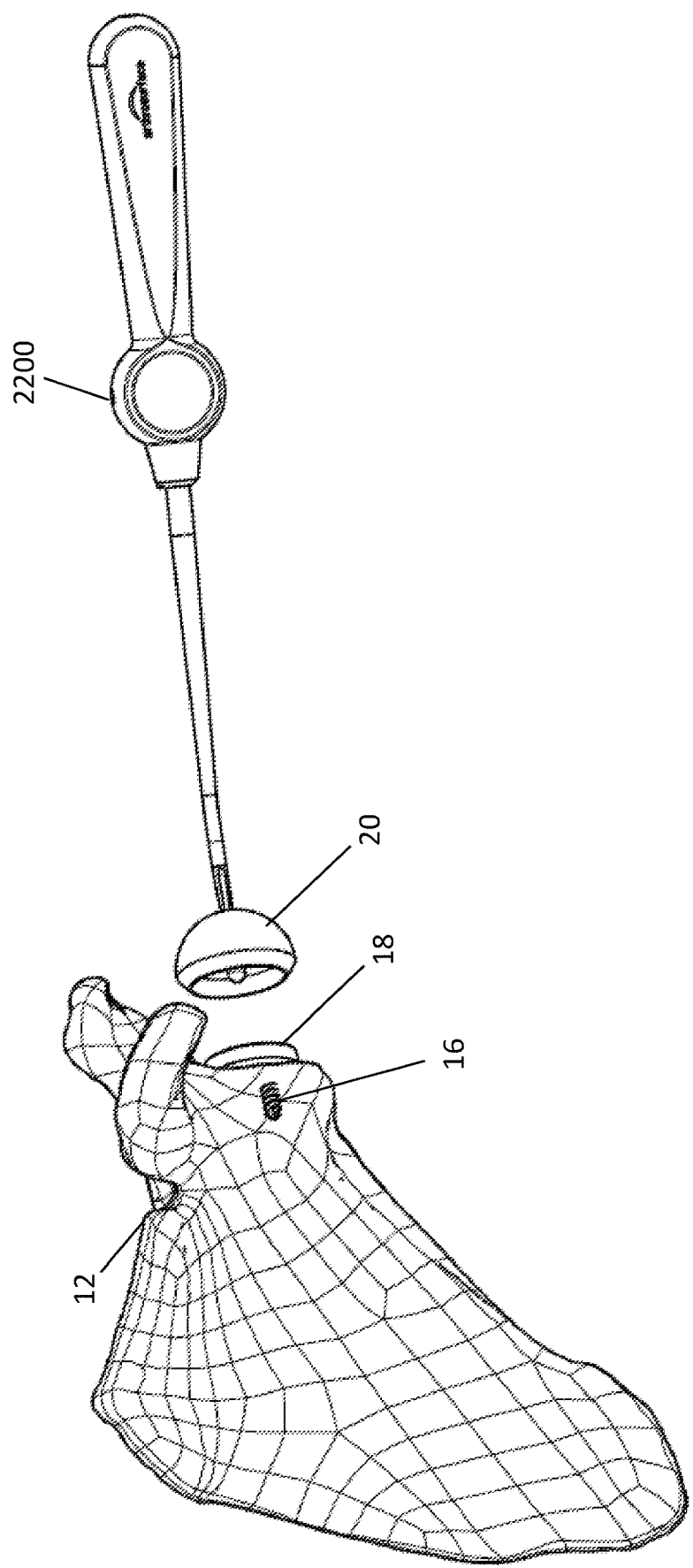
Figure 24:
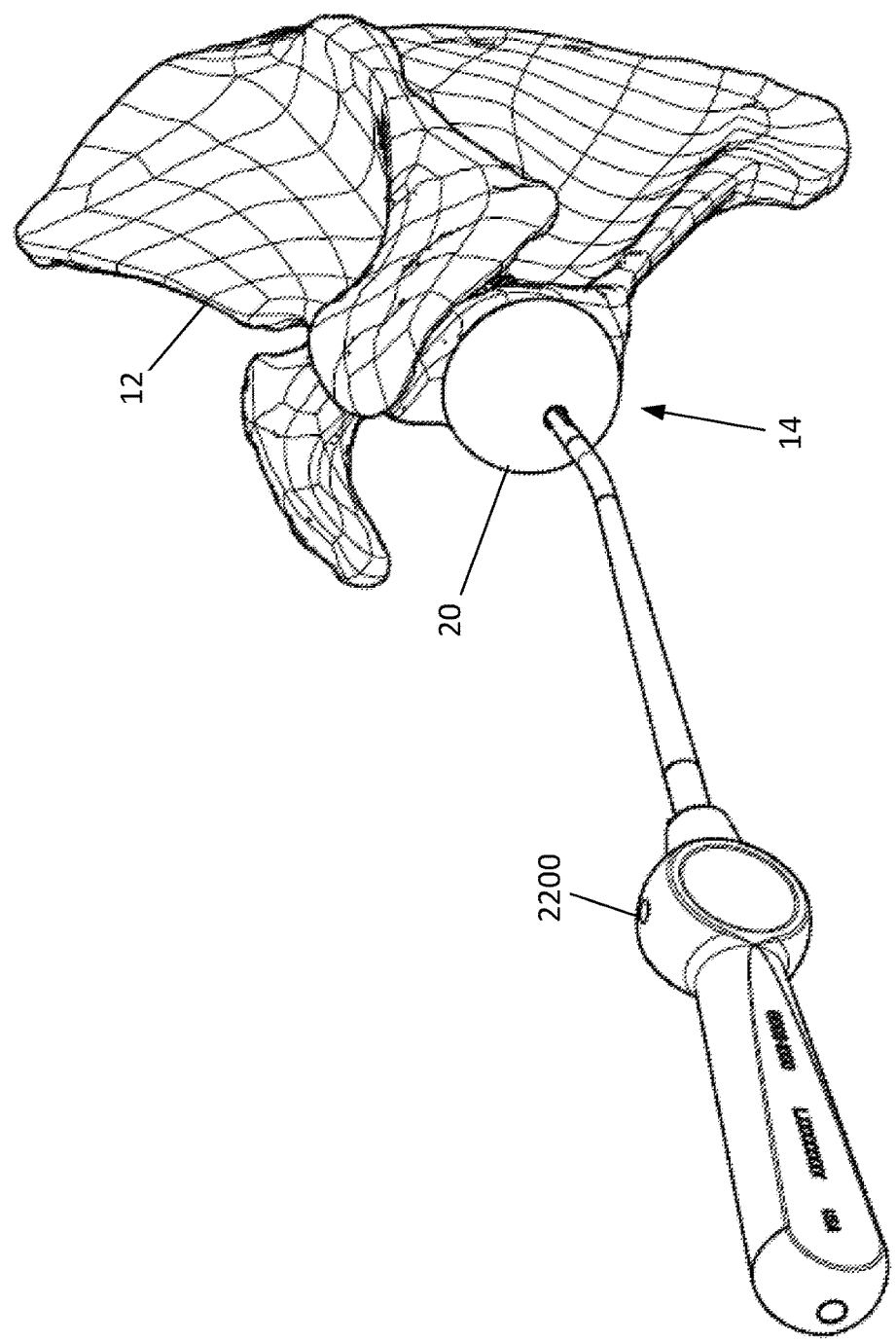
Figure 25:
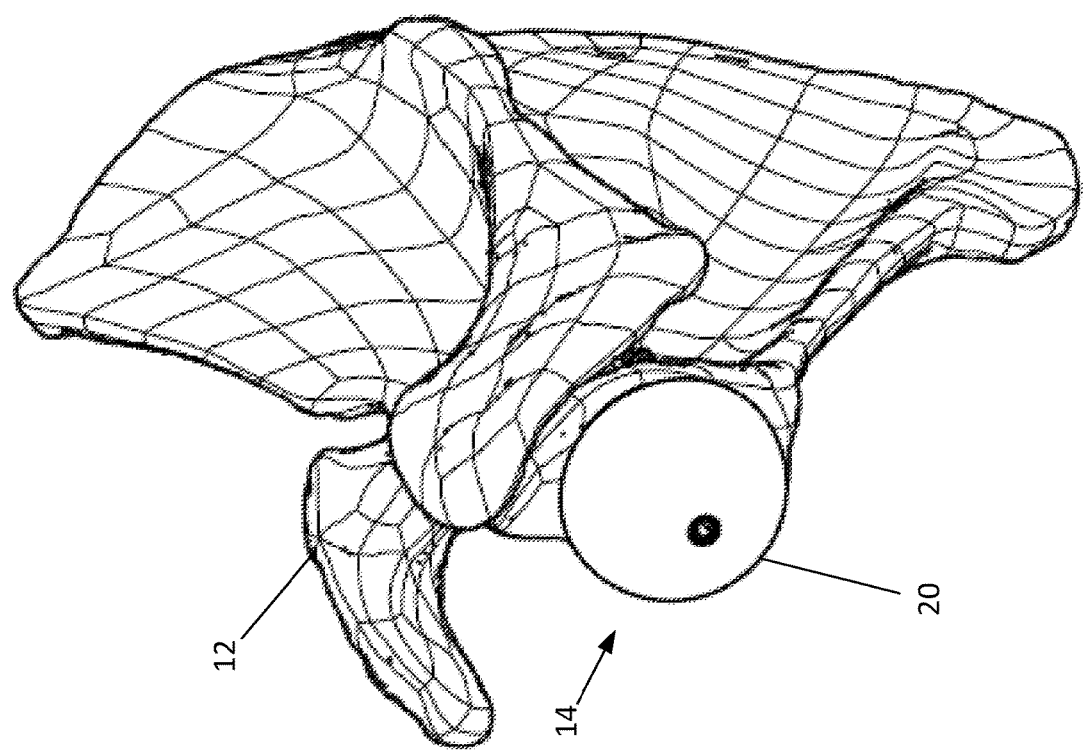
FIGS. 25-26 generally illustrate one example of the implant secured to the baseplate consistent with the present disclosure.
Figure 26:
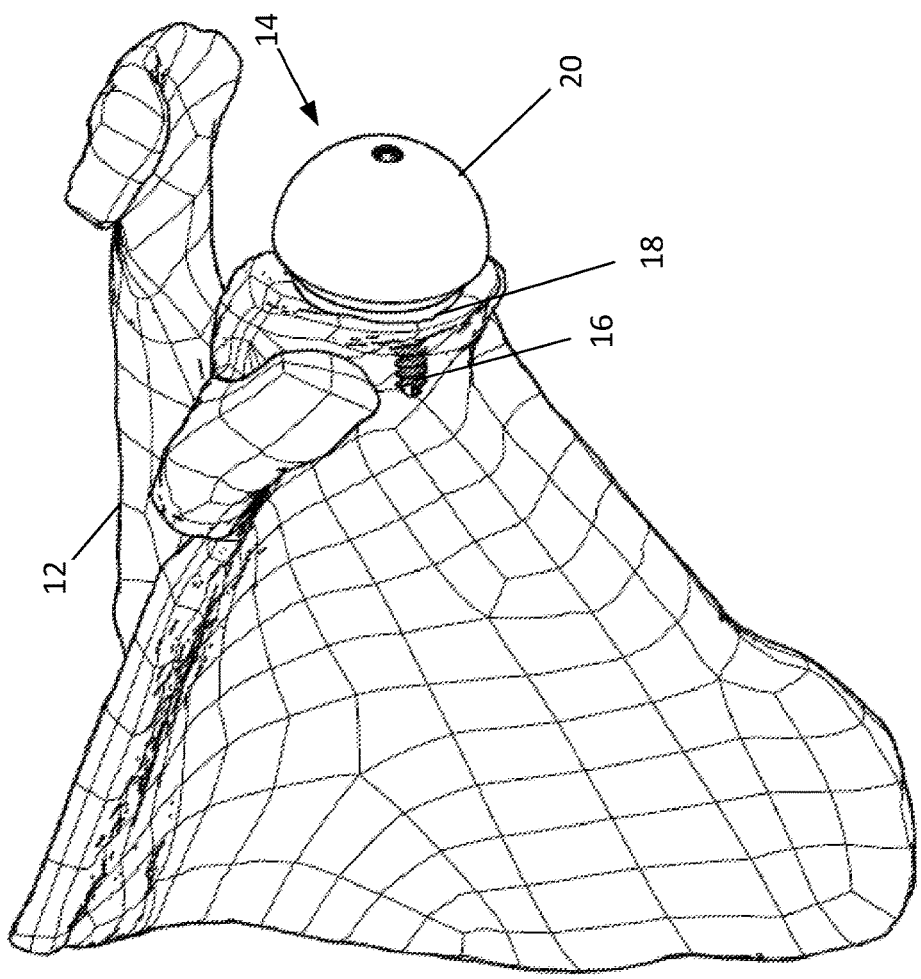
Figure 28:
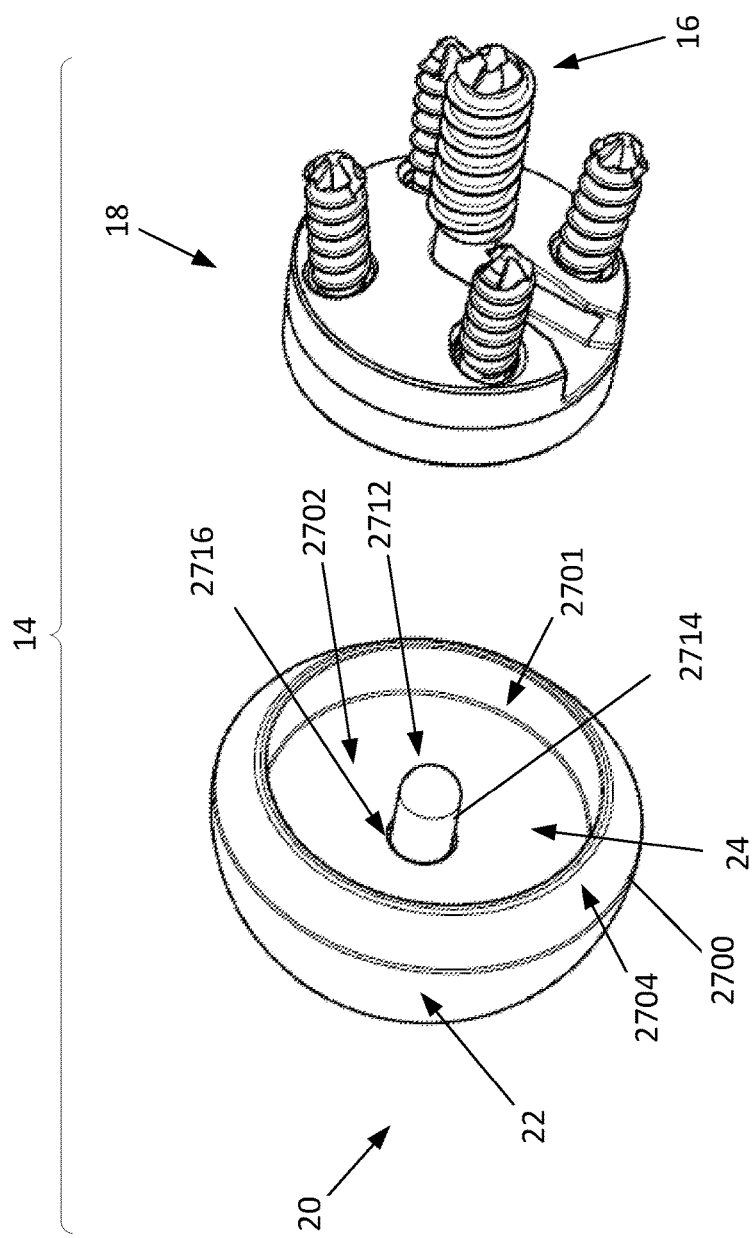
FIG. 28 generally illustrates one example of the implant system in an exploded, unassembled state consistent with the present disclosure.

Optionally, pilot holes 2100, FIG. 21, may be formed in the bone 12 prior to securing the bone screws 1900. For example, a bone screw guide 2102 may be used to align the pilot holes 2100 at the desired angle relative to the baseplate 18, anchor 16, and/or excision site 10. In the illustrated example, the bone screw guide 2102 may include a body 2104 (optionally coupled to a handle 2106) defining a passageway 2108 defining the longitudinal axis of the pilot hole 2100. The body 2104 may include a bushing or the like 2110 configured to be at least partially received in the aperture 1532 of the baseplate 18 to align the passageway 2108 relative to the baseplate 18. A pilot bit 2112 may thereafter be advanced through the passageway 2108 to form the pilot hole 2100.

Once the baseplate 18 has been disposed within the excision site 10 and secured to the anchor 16, the implant 20 may be advanced and secured to the baseplate 18 as generally illustrated in FIGS. 22-26. One example of an implant 20 consistent with the present disclosure is generally illustrated in FIGS. 27A-27B. As noted above, the implant 20 (which may be referred to as a glenosphere in some embodiments) includes an implant body 2700 having an articulating/load bearing surface 22 and a baseplate recess 24. The articulating/load bearing surface 22 may have a generally concaved surface contour (e.g., a reverse shoulder). For example, the concaved shaped load bearing surface 22 may include a semi-spherical shape and/or a semi-ellipsoidal shape. Alternatively, the load bearing surface 22 may include convex surface. The convex surface 22 (e.g., a generally spherical and/or semi-ellipsoid) may generally correspond native articular surface of the patient's glenoid 12. As such, the load bearing surface 22 may have any shape/contour/profile such as, but no limited to, a shape/contour/profile that corresponds to the patient's original, native shape/contour/profile.

The baseplate recess 24 may be configured to be coupled to the baseplate 18. In at least one example, the baseplate recess 24 may be configured to receive at least a portion of the baseplate 18, e.g., at least a portion of the implant facing surface 1506 of the baseplate 18. The baseplate recess 24 may include a baseplate interface surface 2701 configured to be coupled to the implant interface surface 1507 of the baseplate 18. In at least one example, the baseplate interface surface 2701 may include a tapered shape configured to form a tapered interference connection (e.g., a Morse taper or the like) with implant interface surface 1507 of the baseplate 18, e.g., as generally illustrated in FIGS. 29A-29B. In the illustrated example, the baseplate interface surface 2701, FIGS. 27A-27B, may have a generally concaved shape that generally inversely corresponds to the convex shape of the implant interface surface 1507 of the baseplate 18. The baseplate interface surface 2701 and/or the implant interface surface 1507 may generally have corresponding generally frusto-conical and/or frusto-spherical shapes. Of course, the implant 20 may be coupled to the baseplate 18 in any manner known to those skilled in the art such as, but not limited to, by way of one or more threaded connections, snap connections, adhesives, or the like. For example, the baseplate interface surface 2701 and/or the implant interface surface 1507 may have a plurality of toothed and/or keyed surfaces (e.g., multifaceted surfaces) configured to generally prevent movement of the implant 20 relative to the baseplate 18. Alternatively (or in addition), the baseplate interface surface 2701 and/or the implant interface surface 1507 may have non-circular cross-sections (such as, but not limited to, oval, hexed, or the like) configured to generally prevent movement of the implant 20 relative to the baseplate 18.

The baseplate recess 24 may include a base surface 2702, e.g., extending radially inward from the implant interface surface 1507. The base surface 2702 may optionally contact with a portion of the implant facing surface 1506 (FIGS. 35A, 35B, 35C) of the baseplate 18, e.g., to aid in securing the implant 20 to the baseplate 18. In such an example, the base surface 2702 may perform a similar function as the implant interface surface 1507. Alternatively, the base surface 2702 may be spaced apart from a portion of the implant facing surface 1506 of the baseplate 18 such that a gap may be formed therebetween.

The implant 20 may optionally include an implant undercut 2704. The implant undercut 2704 may extend around a lower periphery of the implant body 2700 and be configured to allow the implant 20 to articulate relative to the articulating surface of the cooperating bone (e.g., but not limited to, the articulating surface of the humerus). In some examples, the implant undercut 2704 may contact the bone, for example, a portion of the excision site 10 and/or a remaining portion of the native articular surface proximate the excision site 10.

The implant 20 may optionally include an implant remover 2712. The implant remover 2712 may be configured to allow a user (e.g. a surgeon) to remove the implant 20 from the baseplate 18. The implant remover 2712 may be particularly useful in instances where it is beneficial to perform a revision surgery. To this end, a first implant 20 having a load bearing surface 22 with a first shape/contour/profile (e.g., but not limited to, a convex load bearing surface 22) may be coupled to the baseplate 18 and/or anchor 16 which may be replaced with another (e.g., second) implant 20 having a different load bearing surface 22 (e.g., a second shape/contour/profile such as, but not limited to, a concaved load bearing surface 22) using the implant remover 2712. Of course, the first implant 20 may have a concaved load bearing surface 22 and may be replaced with a second implant 20 having a convex load bearing surface 22.

The implant remover 2712 may comprise a threaded removal fastener (e.g. a threaded bolt, also referred to as a jack screw or jack bolt) 2714 configured to be disposed within a threaded removal passageway 2716 formed in the implant 20. In the illustrated example, the threaded removal passageway 2716 may extend from the load bearing surface 22 to the baseplate recess 24. To remove the implant 20 from the baseplate 18, the threaded removal fastener 2714 may be rotated in the threaded removal passageway 2716 until a distal end 2718 of the threaded removal fastener 2714 contacts either the baseplate 18 and/or the anchor 16. Further rotation of the threaded removal fastener 2714 may cause the implant 20 to lift away from the baseplate 18, thereby disconnecting/removing the implant 20 from the baseplate 18 and/or anchor 16. A proximal end of the threaded removal fastener 2714 may include a driving feature (e.g. but not limited to, a hex connection or the like) configured to engage with a corresponding driving feature of a tool (e.g., a hand driver, drill, or the like).

Figure 29C:
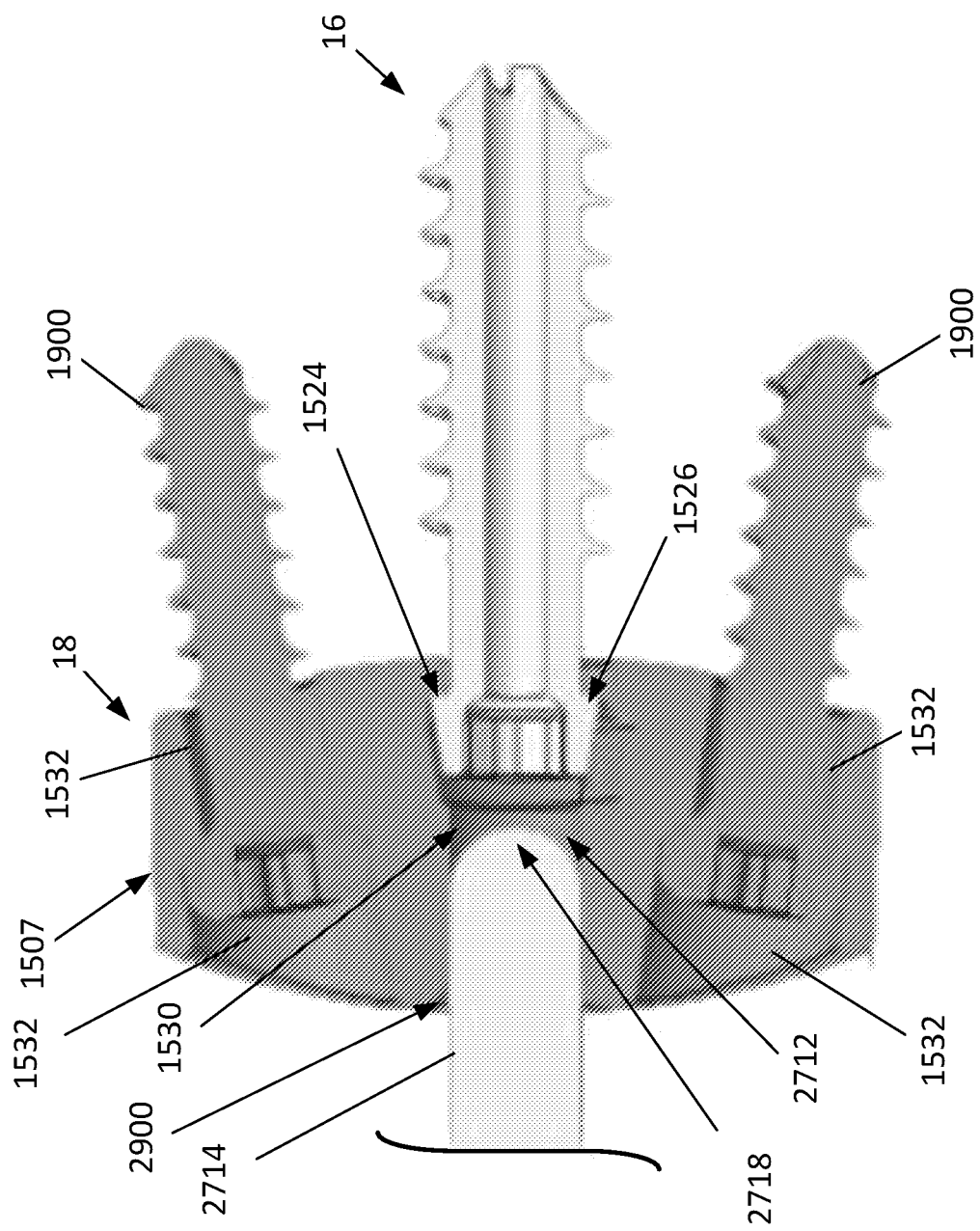
FIG. 29C generally illustrates a cross-sectional view of the baseplate, anchor, and a portion of the implant remover.

In the illustrated example, the baseplate 18 may include a removal cavity 2900 (best seen in FIG. 29B-29C). The removal cavity 2900 (which may also be the same as and/or form part of the driver passageway 1530) may be configured to receive a portion of the threaded removal fastener 2714 when the implant 20 is secured to the baseplate 18 and/or anchor 16. In one example, the removal cavity 2900 extends from the implant facing surface 1506 to the channel 1516, and in at least some examples, the removal cavity 2900 extends from the implant facing surface 1506 to the recess/pocket 1524 of the channel 1516. The threaded removal fastener 2714 may be threaded in the threaded removal passageway 2716 and advanced into the removal cavity 2900 until the threaded removal fastener 2714 bottoms out against a portion of the baseplate 18 and/or the anchor 16 (e.g., the enlarged head 1010 of the anchor 16).

Alternatively (or in addition), the implant remover 2712 may include a threaded removal fastener configured to be threaded to the anchor 16 and/or baseplate 18. In particular, the threaded removal fastener may be rotated away from the anchor 16 and/or baseplate 18 such that a proximal end contacts a portion of a first implant 20 (e.g., but not limited to, the base surface 2702 of the baseplate recess 24) to urge the first implant 20 out of engagement with the anchor 16 and/or baseplate 18. As the threaded removal fastener contacts the first implant 20 and continues to rotate, the first implant 20 may be disconnected from the anchor 16 and/or baseplate 18, and a second implant 20 may thereafter to secured to the anchor 16 and/or baseplate 18 as described herein.

The baseplate 18 may optionally include one or more implant alignment grooves 1550 (best seen in FIGS. 15A-15D). The implant alignment grooves 1550 may be configured to facilitate alignment of the implant 20 with the baseplate 18 when advancing the implant 20 towards and into engagement with the baseplate 18. The implant alignment grooves 1550 may be formed in a portion of the implant facing surface 1506 and may extend from generally from a peripheral region 1552 of the baseplate 18 generally towards the driver passageway 1530 and/or the removal cavity 2900. In particular, when advancing the implant 20 toward the baseplate 18 (e.g., using a tool 2200, FIGS. 22-24, configured to be releasably coupled to the threaded removal passageway 2716 formed in the implant 20), the distal end 2718 of the threaded removal fastener 2714 may be aligned with and advanced into an alignment groove 1550. As the implant 20 is continued to advanced towards the baseplate 18, the threaded removal fastener 2714 may come into engagement with the alignment groove 1550 which may guide the threaded removal fastener 2714 from the peripheral region 1552 of the baseplate 18 generally towards the driver passageway 1530 and/or the removal cavity 2900 such that the baseplate interface surface 2701 of the baseplate recess 24 is in proper alignment with the implant interface surface 1507 of the baseplate 18. Once properly aligned, the baseplate interface surface 2701 may engage the implant interface surface 1507 to secure the implant 20 to the baseplate 18.

Turning now to FIGS. 30-38, additional examples of an anchor 16 and/or baseplate 18 that may be used in combination with an implant 20 to form any example of a glenoid implant system 14 described herein. The anchor 16 and/or baseplate 18 of FIGS. 30-38 may include similar features as those described above, and for the sake of brevity, only the different features will be described. As such, like reference numerals refer to similar components as described herein, except where otherwise described differently.

Figure 30:
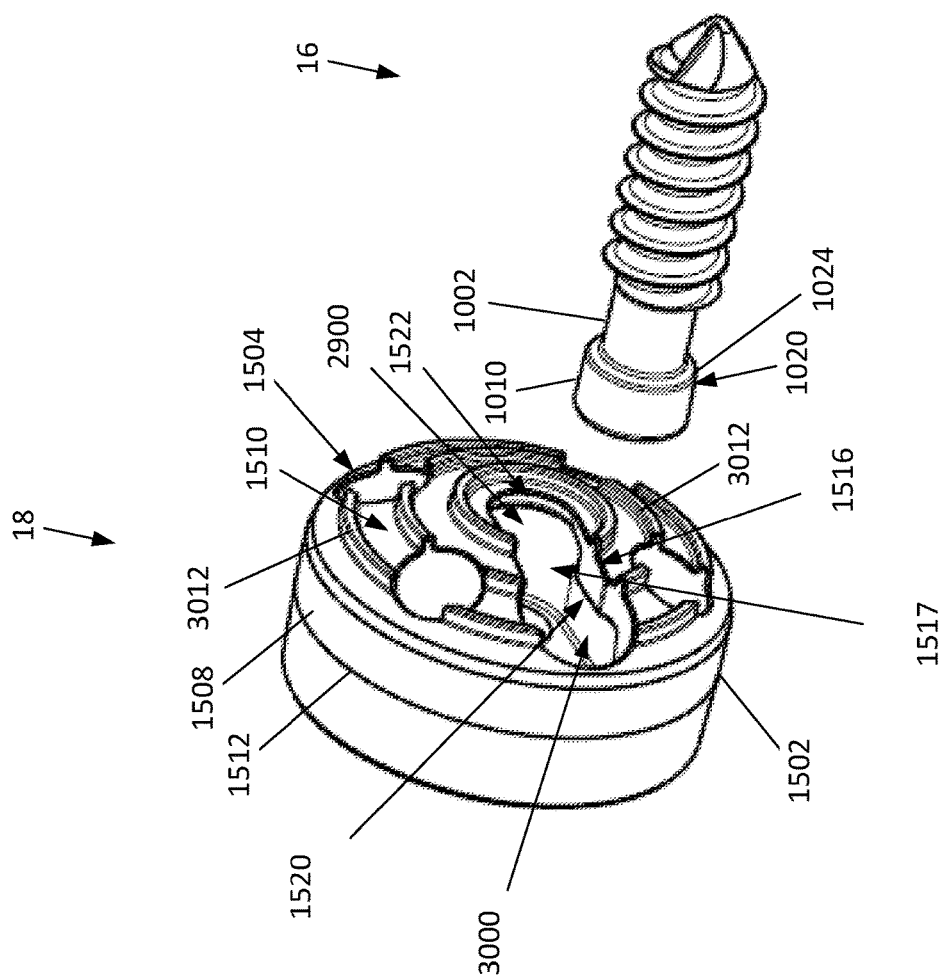
FIG. 30 is an exploded view generally illustrating another example of a baseplate and anchor.
Figure 31:
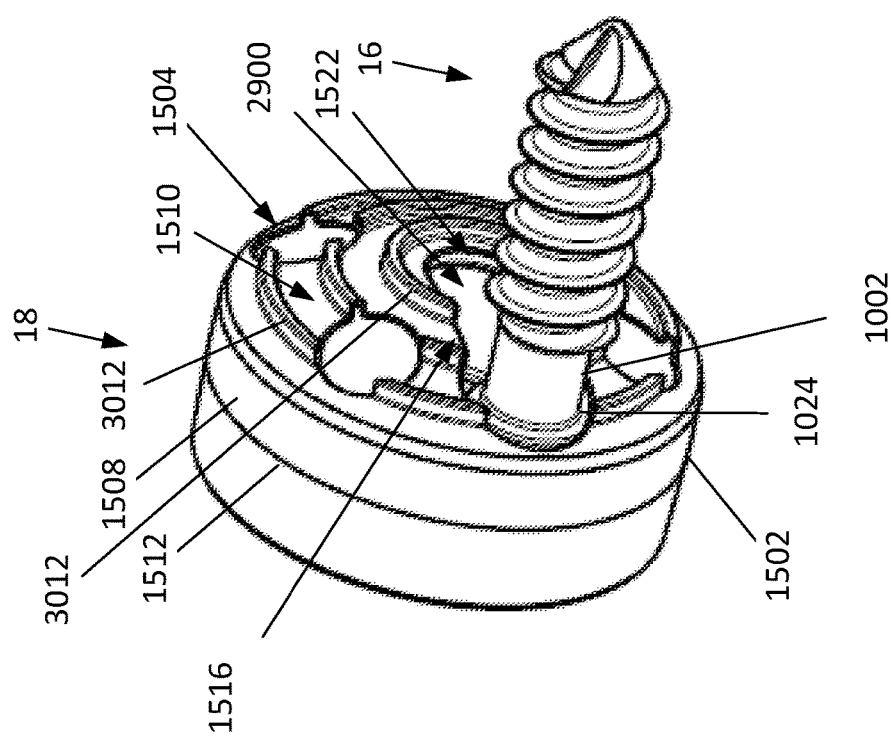
FIG. 31 is a partially assembled view generally illustrating the baseplate and anchor of FIG. 30.
Figure 32:
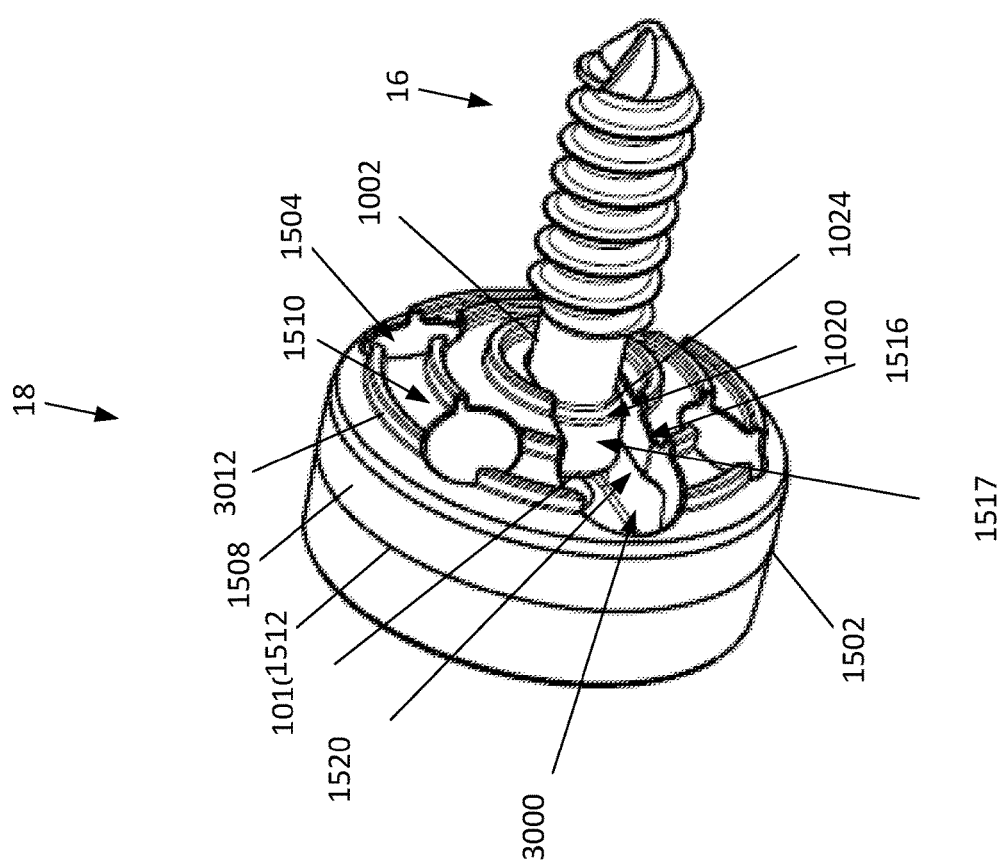
FIG. 32 is an assembled view generally illustrating the baseplate and anchor of FIG. 30.

As described herein, the baseplate 18 may include a channel 1516. The channel 1516 may be configured to receive the enlarged head 1010 and a portion of the shank 1002 of the anchor 16 (e.g., as generally illustrated in FIGS. 30-32). In particular, the channel 1516 may have a cross-section generally corresponding to the cross-section of the enlarged head 1010 and a portion of the shank 1002 such that the enlarged head 1010 and a portion of the shank 1002 can be received through an entrance 1518 of the channel 1516 and enter into the channel 1516, but once inside the channel 1516, cannot be removed from the channel 1516 other than through the entrance 1518.

Whereas the channel 1516 was previously show extending from an outer periphery of the body 1502, the channel 1516 of FIGS. 30-38 may be formed only in (e.g., extend only from) the base 1510 of the bone facing surface 1504 of the body 1502. In particular, the channel 1516 may replace the lateral entrance 1518 with a bone facing entrance 3000 formed in the base 1510 of the bone facing surface 1504 of the body 1502 (e.g., as generally illustrated in FIGS. 30-33 and 35-36D). As such, the outer periphery of the body 1502 (e.g., the sidewall 1508) may remain uninterrupted. The uninterrupted configuration may allow the outer periphery of the body 1502 (e.g., the sidewall 1508) to more closely match the size and/or dimensions of the excision site 10 (e.g., more closely match the size and/or dimensions of the sidewalls 705 of excision site 10, which may be generally circular, generally oval, or the like). The closer match between the baseplate 18 and the excision site 10 may further reduce movement (e.g., micromovements) of the baseplate 18 relative to the excision site 10. In addition, the elimination of the lateral entrance 1518 in the sidewall 1508 of the bone facing surface 1504 may further enhance bone regrowth, thereby further securing the baseplate 18 to the bone 12 and minimizing movement.

As mentioned above, the channel 1516 may extend radially from an outer periphery of the base 1510 of the bone facing surface 1504 to a central region (e.g., a center) of the baseplate 18. The slot/open region 1517 of the channel 1516 may also be formed by the base 1510 of the bone facing surface 1504. The entrance 3000 may have a larger cross-section than the enlarged head 1010, and may be tapered, to facilitate alignment and advancement of the enlarged head 1010 through the entrance 1518 and into the channel 1516. The taper may include a taper that increases closer to the bone facing surface 1504 and/or a taper that decreases closer to the bone facing surface 1504, and may inversely correspond to the taper of the enlarged head 1010. The channel 1516 may include interior surfaces 1520 forming an undercut (e.g., having a concaved profile). In one example, at least a portion of the interior surfaces 1520 (e.g., the bottom portion) generally corresponds to the cross-section of the enlarged head 1010 (e.g., the taper of the enlarged head 1010). The interior surfaces 1520 of the channel 1516 may also be configured to facilitate alignment and advancement of the enlarged head 1010 through the channel 1516. The slot/open region 1517 of the channel 1516 may generally correspond to the cross-section of the shank 1002 of the anchor 16. The entrance 3000 may also have a larger cross-section than the slot/open region 1517 of the channel 1516 such that once the enlarged head 1010 is advanced into the channel 1516, the enlarged head 1010 cannot be removed other than through the entrance 3000.

Figure 33:
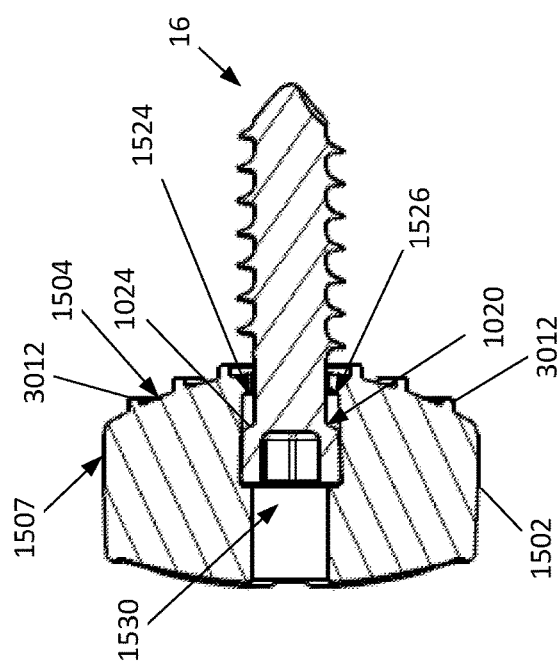
FIG. 33 is a cross-sectional view of the baseplate and anchor of FIG. 31.
Figure 34:
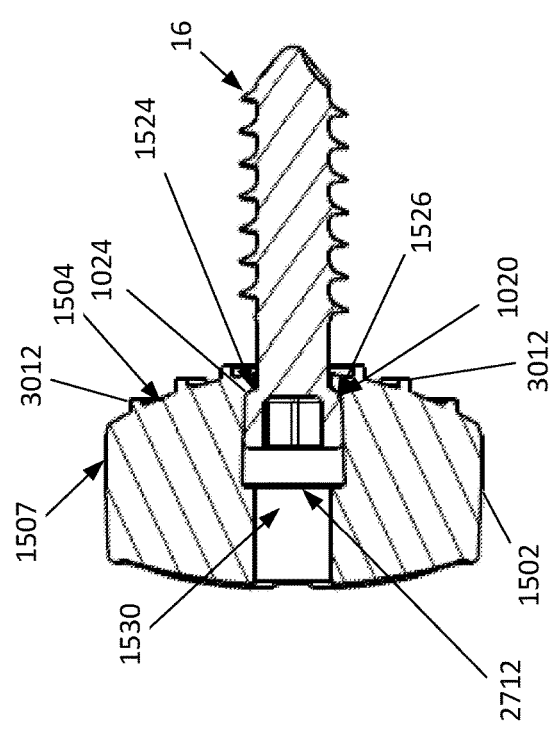
FIG. 34 is a cross-sectional view of the baseplate and anchor of FIG. 32.

A distal end region 1522 of the channel 1516 includes a recess or pocket 1524 (see also FIGS. 33-34). The recess/pocket 1524 is configured to receive at least a portion of the enlarged head 1010 of the anchor 16. In at least one example, the enlarged head 1010 (see, e.g., FIGS. 37A-38E) may include an anchor engagement surface 1020 configured to engage with a corresponding baseplate engagement surface 1526 (see, e.g., FIGS. 33-34) of the recess/pocket 1524. For example, the anchor engagement surface 1020 may include a shoulder 1024 having a cross-section (e.g., a diameter) that substantially corresponds to the cross-section (e.g., a diameter) of the baseplate engagement surface 1526 of the recess/pocket 1524. At least one embodiment, the baseplate engagement surface 1526 of the recess/pocket 1524 may form a generally cylindrical recess/pocket.

Alternatively (or in addition), the anchor engagement surface 1020 may include a taper that substantially corresponds to a taper of the baseplate engagement surface 1526 of the recess/pocket 1524 to form a tapered interference connection (e.g., a Morse taper or the like). As noted herein, the taper of the enlarged head 1010 may include a taper that decreases from the proximal end towards a distal end 1025 as generally illustrated in FIGS. 33-34, and/or may include a taper that increases from the proximal end 1008 towards a distal end 1025 as generally illustrated in FIGS. 10A-10F. In particular, rotation of the anchor 16 after the baseplate 18 has been advanced over the enlarged head 1010 of the anchor 16 (e.g., rotation of the anchor 16 from the position generally illustrated in FIG. 33 to the position generally illustrated in FIG. 34) may cause the anchor engagement surface 1020 (e.g., the tapered surface) to engage (e.g., contact) the corresponding baseplate engagement surface 1526 (e.g., tapered surface) of the recess/pocket 1524 to secure the baseplate 18 to the anchor 16 and prevent separation of the baseplate 18 from the anchor 16.

As discussed herein, the excision site 10 may include one or more recesses and/or protrusions. In at least one example, the recesses and/or protrusions may be revolved around the working axis 300. The recesses and/or protrusions may, in at least one example, be formed by the cutting surfaces 606. The recesses and/or protrusions may, in at least one example, inversely correspond to recesses and/or protrusions 3012, FIGS. 30-36) on the bone facing surface 1504 of the baseplate 18, for example, to generally form a mating connection therebetween. The recesses and/or protrusions 3012 on the bone facing surface 1504 of the baseplate 18 may be revolved around the working axis 300 and/or the recess/pocket 1524. By way of a non-limiting example, the bone facing surface 1504 may include one or more ridges, protrusions, and/or ribs 3012 extending therefrom that are configured to be at least partially received within one or more recesses and/or grooves formed in the excision site 10 (e.g., but not limited to, the base 707 of the excision site 10). Of course, while the bone facing surface 1504 may include one or more ridges, protrusions, and/or ribs 3012, the bone facing surface 1504 may include one or more recesses and/or grooves. The mating connection between the recesses and/or protrusions formed in the excision site 10 and the recesses and/or protrusions 3012 on the bone facing surface 1504 of the baseplate 18 may aid in securing the baseplate 18 to the excision site 10, and further minimize relative movement therebetween.

Turning now to FIGS. 37A-E, the anchor 16 may include a threaded region 3700 having a cross-section (e.g., a diameter) that is larger than a cross-section (e.g., diameter) of the enlarged head 1010. The increased cross-section of the of the threaded region 3700 increases the retention strength of the anchor 16 within the excision site 10, thereby minimizing movement of the implant system 14. Moreover, the increased cross-section of the of the threaded region 3700 reduces the potential of the anchor 16 causing to the bone 12, for example, due to movement of the anchor 16 with respect to the bone 12. It should be appreciated that the threaded region 3700 may have a larger cross-section than the enlarged head 1010 because the anchor 16 is received in the channel 1516, rather than being advanced through the implant facing surface 1506. In addition, the larger cross-section of the threaded region 3700 may allow for fewer supplemental screws 1900 and/or the elimination of these screws 1900. The reduced number of supplemental screws 1900 and/or the elimination of these screws 1900 may also allow the cross-section (e.g., diameter) of the baseplate 18 to be reduced, thereby allowing the implant system 14 to be compatible with a larger number of patients.

Turning now to FIGS. 35A-E, the implant facing surface 1506 may include one or more anchor alignment features 3500. The anchor alignment feature 3500 may include any indicia that facilitates positioning of the baseplate 18 relative to the anchor 16. In particular, since the channel 1516 may be formed on the implant facing surface 1506, the entrance 3000 may not be visible when advancing the baseplate 18 over the enlarged head 1010 of the anchor 16. The anchor alignment feature 3500 may aid the surgeon in properly aligning the baseplate 18 relative to the anchor 16 such that the enlarged head 1010 is received through the entrance 3000. In the illustrated example, the anchor alignment feature 3500 may include a region not having an implant alignment feature and/or groove 1550; however, it should be appreciated that this is merely one example, and any indicia that can be used to align the baseplate 18 relative to the anchor 16 may be used.

It should be appreciated that any of the components of the glenoid implant system described herein may be used in any combination. For example, any of the anchors, baseplates, and/or implants described herein, or any features of anchors, baseplates, and/or implants, may be used in any combination.

As used herein, "substantially corresponds" or "generally corresponds" means that the contour/profile of the articulating surface is within 15% of the contour/profile of the patient's native articular surface being replaced. In some instances, the contour/profile of the articulating surface may not correspond to the contour/profile of the patient's native articular surface being replaced.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims.

What is claimed is:

1. An implant system comprising:
   an anchor configured to be secured to bone within an excision site formed in a patient's glenoid, said anchor including a shank and an enlarged head;
   a baseplate including a body comprising:
   a bone facing surface;
   an implant facing surface; and
   a channel defined only in the bone facing surface of the body; said channel having a bone facing entrance formed in the bone facing surface of the body toward an outer periphery of the body and a slot region formed in the bone facing surface of the body extending from the bone facing entrance to a center of the bone facing surface of the body; said bone facing entrance configured to receive said enlarged head and a portion of said shank and wherein said slot region is configured to engage said enlarged head when the baseplate body is moved relative to the anchor and wherein the enlarged head of the anchor is configured to engage the center of the bone facing surface; and
   an implant including a body defining a load bearing surface and a baseplate recess, said baseplate recess configured to receive at least a portion of said implant facing surface of said baseplate such that said implant is coupled to said baseplate.

2. The implant system of claim 1, wherein said load bearing surface has a generally hemispherical shape.

3. The implant system of claim 1, wherein said implant comprises a glenosphere.

4. The implant system of claim 1, wherein said bone facing surface is configured to engage against said bone within said excision site.

5. The implant system of claim 1, wherein said bone facing surface has a generally circular cross-section.

6. The implant system of claim 5, wherein said bone facing surface includes a sidewall extending generally towards said implant facing surface from a base.

7. The implant system of claim 1, wherein at least a portion of said implant facing surface of said baseplate is configured to be coupled to said implant.

8. The implant system of claim 7, wherein said implant facing surface has a generally convex shape configured to be received in at least a portion of said implant.

9. The implant system of claim 8, wherein said implant facing surface includes an implant interface surface having a tapered shape configured to form a tapered interference connection with at least a portion of said baseplate recess of said implant.

10. The implant system of claim 8, wherein said implant facing surface has a generally convex shape that generally inversely corresponds to at least a portion of said baseplate recess of said implant.

11. The implant system of claim 1, wherein said baseplate is configured to be coupled to said implant by way of at least one threaded connection, snap connection, or adhesive.

12. The implant system of claim 1, further comprising an implant remover configured to disconnect said implant from said baseplate.

13. The implant system of claim 12, wherein said implant remover comprises a threaded removal fastener configured to be rotated and engage said implant to separate said implant from said baseplate.

14. The implant system of claim 13, wherein said threaded removal fastener is configured to be threaded within a threaded removal passageway formed in said implant.

15. The implant system of claim 13, wherein said threaded removal fastener is configured to be threaded within a threaded removal passageway formed in at least one of said baseplate or said anchor.

16. The implant system of claim 1, further comprising at least one fastener configured to be advanced through an aperture formed in said baseplate and into said bone within said excision site.

17. The implant system of claim 1, wherein said channel further comprises a pocket configured to receive at least a portion of said enlarged head of said anchor.

18. The implant system of claim 17, wherein said enlarged head includes an anchor engagement surface configured to engage with a corresponding baseplate engagement surface of said pocket.

19. The implant system of claim 18, wherein said anchor engagement surface includes a shoulder having a cross-section that substantially corresponds to a cross-section of said baseplate engagement surface of said pocket.

20. The implant system of claim 18, wherein said baseplate engagement surface forms a generally cylindrical pocket.

21. The implant system of claim 18, wherein said anchor engagement surface includes a taper that substantially corresponds to a taper of said baseplate engagement surface to form a tapered interference connection.

22. The implant system of claim 1, wherein said anchor includes a threaded region, said threaded region having a larger cross-section than said enlarged head.

* * * * *